Figure 1:
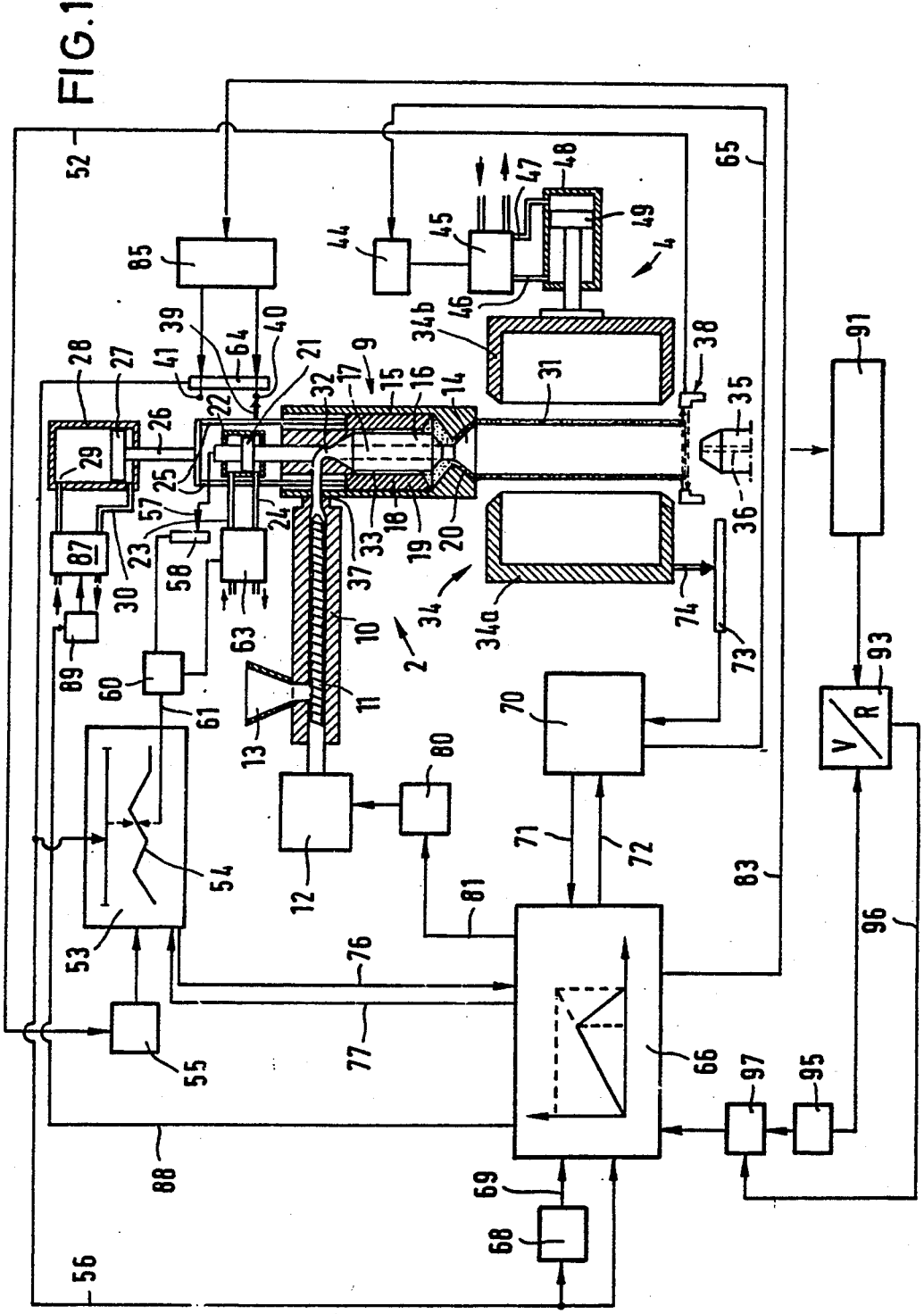

United States Patent [19]
Kiefer et al.

[11] Patent Number: 5,409,647
[45] Date of Patent: Apr. 25, 1995

[54] PROCESS FOR THE PRODUCTION OF HOLLOW BODIES FROM THERMOPLASTIC MATERIAL

[75] Inventors: Erich Kiefer, Bonn 3; Peter Klüsener, Bonn 2, both of Germany

[73] Assignee: Krupp Kautex Maschinenbau GmbH, Bonn, Germany

[21] Appl. No.: 688,623
[22] PCT Filed: Oct. 27, 1990
[86] PCT No.: PCT/DE90/00824
§ 371 Date: Jun. 13, 1991
§ 102(e) Date: Jun. 13, 1991
[87] PCT Pub. No.: WO91/06418
PCT Pub. Date: May 16, 1991

[30] Foreign Application Priority Data
Nov. 1, 1989 [DE] Germany ............... 39 36 301.5

[51] Int. Cl.$^6$ ............... B29C 49/04; B29C 49/78
[52] U.S. Cl. ............... 264/40.4; 264/40.1; 264/40.7; 264/540; 264/541; 425/140; 425/145; 425/150; 425/532
[58] Field of Search ............... 264/40.1, 40.2, 40.4, 264/40.7, 540, 541; 425/140, 145, 148, 150, 532

[56] References Cited
U.S. PATENT DOCUMENTS

| | | | |
|---|---|---|---|
| 3,865,528 | 2/1975 | Roess | 425/145 |
| 4,159,293 | 6/1979 | Fukase et al. | 264/40.5 |
| 4,179,251 | 12/1979 | Hess et al. | 425/140 |
| 4,224,561 | 9/1980 | Handte | 318/663 |
| 4,338,071 | 7/1982 | Daubenbüchel et al. | 425/140 |
| 4,382,761 | 5/1983 | Daubenbüchel et al. | 425/140 |
| 4,444,702 | 4/1984 | Thomas et al. | 264/541 |
| 4,474,716 | 10/1984 | Daubenbüchel et al. | 264/40.4 |
| 4,959,001 | 9/1990 | Langlois et al. | 425/147 |
| 4,971,542 | 11/1990 | Langlois et al. | 425/147 |
| 5,102,588 | 4/1992 | Feuerherm | 264/541 |

FOREIGN PATENT DOCUMENTS

| | | | |
|---|---|---|---|
| 0027575 | 4/1981 | European Pat. Off. | |
| 3416781 | 11/1985 | Germany | 264/541 |
| 2220607 | 1/1990 | United Kingdom | 425/135 |

OTHER PUBLICATIONS

Translation of Kunstoffe Band 70, No. 9, Sep. 1980, R. Hegele et al.: "Gewichtsregelung an kontinuierlich extrudierenden Blasformanlagen," pp. 522–524.

"Conference Proceedings of the New York ANTE'89 Society of Plastic Engineers 47th Annual Technical Conference Exhibits", 1.–4. Mai 1989, H. Schrand: Adaptive control loops reduce scrap pp. 952–953.

*Primary Examiner*—Catherine Timm
*Attorney, Agent, or Firm*—Panitch Schwarze Jacobs & Nadel

[57] ABSTRACT

In that process for the production of hollow bodies from thermoplastic material by extrusion blow molding in which discontinuously extruded preforms are expanded in a blow molding mold, at least during that part of the filling phase which is typical of such a process, for an extrusion head, the distance covered by an ejection piston associated with a storage chamber and the speed at which the ejection piston is displaced within the storage chamber by the plasticised material are detected and compared by a central control and regulating device to the respective reference values. On the basis of the result of the comparison operation at least one operating parameter of the process, for example the delivery output of the extruder or the extent of the emptying strike movement of the ejection piston can then be adapted while still in the same working cycle in such a way that substantially the required preform volume is ejected.

24 Claims, 11 Drawing Sheets

PROCESS FOR THE PRODUCTION OF HOLLOW BODIES FROM THERMOPLASTIC MATERIAL

The invention relates to a process for the production of hollow bodies from thermoplastic material, in which process firstly preforms are discontinuously produced and are then expanded under an internal increased pressure in the mold cavity of a divided blow molding mold. An extrusion blow molding machine provided for that purpose comprises an extrusion unit and a blow molding unit, the respective operating procedures of which must be matched to each other.

Such an extrusion unit has at least one continuously operating extruder for plasticising the plastic material which is generally in granulate form, and an extrusion head in which there are disposed at least one storage chamber for storage of the plasticised material and at least one means for emptying the storage chamber, said emptying means being reciprocatable with a stroke-like movement between two limit positions. In that arrangement the storage chamber is generally annular and the means for emptying the storage chamber is in the form of an annular piston. Therefore, for the sake of simplicity, reference is primarily made hereinafter to an annular piston, without that being intended to involve a limitation.

In the discontinuous formation of the preforms, it is possible to make a distinction between two operating phases in dependence on the stroke movement of the annular piston within the extrusion head during a working cycle. In the one operating phase, the filling or storage phase, the storage chamber is filled with plasticised material, with displacement of the annular piston, until the annular piston reaches its limit position at the end of the filling operation. In the following operating phase, being the ejection or emptying phase, the stored material is ejected from the storage chamber under the effect of the annular piston which is moved by drive means, and urged towards the outlet opening of the extrusion head, with the plasticised material flowing through a communicating duct which is disposed between the storage chamber and the outlet opening. During that second operating phase the ejected material for the preform is predominantly formed by the material being urged out of the storage chamber by the annular piston. However also added thereto is a portion of material which is conveyed into the extrusion head by the continuously operating extruder during the ejection stroke movement. The volume of the total amount of material which issues from the extrusion head is accordingly made up of a portion by volume which was previously stored in the at least one storage chamber, and a portion by volume which is conveyed into the extrusion head during the ejection period by the at least one extruder. The uninterrupted operation of the extruder for plasticising the material is desirable so that the operating condition thereof can be stabilised. The piston reaches its other limit position at the end of the emptying operation.

The preform which is formed during the ejection operation and which generally hangs vertically at the outlet opening of the extrusion head is received by a blow molding mold which is at least divided into two. In that respect, at least a part of the central portion by volume of the overal portion by volume which forms the preform is expanded under an increased internal pressure within the mold cavity of the blow molding mold. The end portions of the overall portion by volume are squeezed off as waste material by a squeezing-off operation in which the blow molding mold portions are involved so that the waste material remains outside the mold cavity. After expansion of the central portion by volume, the hollow body formed is cooled until it is of sufficient stiffness so as to retain its shape upon being removed from the blow molding mold.

Accordingly the cycle time of a working cycle of such a blow molding unit is essentially composed of a receiving time, an expansion time, a cooling time and a removal time and movement times in respect of the blow molding mold portions, while possibly still further additionally required periods have to be taken into account, which are known to any man skilled in the art and which are therefore not discussed in further detail herein. It is known that in particular the cooling time has an effect on the duration of the overall working cycle. As the times required for the other movement procedures involved in the blow molding mold also cannot be readily freely selected, the cycle time of the blow molding unit is usually taken as the cycle time of the entire extrusion blow molding machine.

That means that the cycle time for the working cycle of the associated extrusion unit is also fixed as the endeavour is to provide for the production of a preform during a working cycle of the blow molding unit. In the case that two or more blow molding units are associated with a head, the cycle time for the extrusion unit corresponds to a corresponding fraction of the cycle time of a blow molding machine. It is also possible to provide a plurality of extruders in an extrusion unit, in which case that generally has an effect on a reduction in the required delivery outputs of the individual extruders. Hereinafter however reference is primarily made to an extruder with which a blow molding unit is associated, without that being intended to involve a limitation.

The production process takes place in a particularly advantageous manner if the preform is ejected as precisely as possible when the blow molding mold is ready to receive it. Operating procedures on the part of the blow molding unit or the extrusion unit, which depart from that situation, result in a reduction in the level of productivity and possibly also result in the quality of the products being impaired.

In many cases, in the production of hollow bodies by means of extrusion blow molding, it is appropriate and possibly even necessary for the wall thickness or gauge of the preform to be influenced during the ejection process, for example in such a way that the regions on the preform which in the subsequent expansion thereof under an increased internal pressure are subjected to a great stretching effect are of greater wall thickness than those parts which are only less expanded. In that way it is possible to produce hollow bodies which are adapted to the respective requirements involved and in particular hollow bodies of substantially uniform wall thickness. That is achieved by virtue of the fact that the width of the generally annular outlet opening of the extrusion head is enlarged or reduced in width in known manner for example by means of a movable internal portion. In that arrangement, to move the internal portion, use is made of a wall thickness programmer which, during the emptying phase, that is to say during the emptying stroke movement performed by the annular piston, moves the internal portion of the outlet opening into a predetermined position which corresponds to the respectively desired wall thickness, in dependence on the distance covered by the annular piston. In that connection it is assumed that the arrangement generally provides a constant ejection speed on the part of the annular piston and a constant delivery output on the part of the extruder. A process for the production of hollow bodies from thermplastic material by a blow molding process in which the preforms are discontinuously produced using a wall thickness programmer is disclosed in German published specification (DE-AS) No 25 44 609.

Particularly when using wall thickness control means, it is necessary to ensure that the preform is ejected from the extrusion unit, with the desired volume, as otherwise the predetermined distribution of wall thickness is displaced along the longitudinal extent of the preform relative to the mold cavity of the blow molding mold, thus resulting in a hollow body with the wrong distribution of wall thickness.

The working procedure of the extrusion unit is generally to be so adjusted to the working procedure of the blow molding unit that the volume required for a preform is plasticised by the extruder within the period of a working cycle. It is only the delivery output of the extruder which usually operates continuously, that is determined on the basis of that condition. In order to carry out the process described in the opening part of this specification and in regard to design of the extrusion head required therefor, it is also necessary to define further operating parameters for the working procedure, for example the volume of the material to be stored, which is adjusted by the stroke movement of the annular piston within the storage chamber, and the ejection speed of the annular piston.

When adjusting those operating parameters, care has to be taken to ensure that the total material issuing from the outlet opening does not just correspond to the material which is collected in the storage chamber in the filling phase. On the contrary, as already mentioned, it is made up of the previously stored material and the material which is conveyed into the extrusion head during the ejection phase by the extruder. Accordingly the volume of the portion of material to be collected in the storage chamber is such that, together with the portion of material which is delivered by the extruder during the ejection phase, it gives the volume which forms the preform.

Hereinafter the overall volume which forms the preform is referred to as the gross volume which accordingly corresponds to the volume of material of the expanded hollow body plus the volume of material constituting the waste.

It is generally known that, due to the generally relatively narrow outlet opening and the characteristics of the plastic material on issuing from that opening, it is not possible for the material discharge speeds to be set at just any level, without flow markings or the like occurring on the surface of the preform under certain circumstances, with the result that the finished hollow body does not present the required level of quality in respect of its surface nature. Accordingly, a speed range which is suitable for the respective plastic material with a given outlet opening is selected for the material discharge speed. As the required gross volume is to issue from the outlet opening during the ejection phase, the time within which the ejection operation takes place can be defined by means of the appropriate discharge speed.

Accordingly the cycle time of the extrusion unit can be divided into two successive periods, the storage time and the ejection time. The working procedure of the associated blow molding unit also predetermines the moment in time at which the ejection operation can begin at the earliest, as it is only at that time that the divided blow molding mold is in its readiness position in which it can receive the preform. That is important for the reason that in many cases the closing unit of the blow molding mold is constantly disposed under the outlet opening of the extrusion head so that discharge of the plasticised material when the blow molding mold is not yet closed can result in serious disturbances in the machine and/or disturbances in the operating procedure.

On the basis of those three operating parameters, namely the gross volume, the cycle time and the ejection time, which are predetermined for the extrusion process having regard to the preform to be produced, the operating procedure of the blow molding unit and the properties of the thermoplastic material, it is possible to define the other operating parameters of the ideal extrusion process.

The volume of the material to be stored is made up of the amount of material which is delivered to the extrusion head by the extruder during the storage time which corresponds to the difference between the cycle time and the ejection time. As the piston and accordingly the storage chamber are of a constant cross-section, that therefore establishes the length of the stroke movement which the piston performs during the storage phase by virtue of the displacement thereof under the effect of the plasticised material. The annular piston must cover that stroke movement distance during the ejection phase within the ejection time, in a direction towards the outlet opening, so that the ejection speed thereof can be ascertained from that condition.

In that connection the volume to be stored is smaller than the overall volume issuing from the extrusion head; in that respect, if the extrusion process takes place in accordance with those reference parameters, during the ejection phase it is just the amount of material which corresponds to the difference between the volume required for a preform and the stored material, that is plasticised by the extruder.

The gross volume of the preform, which is referred to for the purposes of describing the invention, is the weight of the hollow body to be produced together with the waste portions which do not take part in the expansion process. As the density of the thermoplastic material changes in dependence on temperature and pressure, the same mass of plastic material is of different volumes during the extrusion procedure. The gross volume therefore represents an abstract parameter which can be checked at the end of the production process by a check in respect of weight of the overall amount of material ejected. The gross volume for the purposes of describing the process is advantageous for the reason that the adjustable operating parameters of the extrusion process, namely the stroke movement of the piston and the speed of the piston, also represent geometrical parameters during the ejection phase. At any event there is a direct relationship between the required weight and the set gross volume as, if the overall preform is of excessively low weight, it is to be assumed that the selected gross volume is too small and vice-versa.

In operation of an extrusion unit, it must be borne in mind that the system comprising the extrusion head and the at least one extruder is subjected to influences which are unforeseeable and which cannot always be defined. Such influences involve inter alia fluctuations in temperature and deviations in the physical properties of the plastic material to be processed, from the reference values thereof. Both influences may result for example in fluctuations in the viscosity of the plastic material in the system, and they also have an effect in particular on the efficiency of the extruder, that is to say the amount of material delivered per unit of time.

Not least due to the above-described influences, the extrusion blow molding process, like all other technical processes, is subjected to fluctuations of generally greater or lesser magnitude and thus inaccuracies in regard to a predetermined reference or desired operating status which is to be observed. Accordingly the properties of the products produced by such a process also exhibit fluctuations which in part can result in serious reductions in quality. It is therefore necessary to involve regulating devices which detect the deviations of individual items of equipment for carrying out the process involved, from a reference value which is to be observed, and produce suitable variations in the regulated operating parameters in order to adapt them to the reference value.

Known regulating devices for the working procedure for discontinuous production of preforms detect for example the position of the annular piston at the predetermined moment of time at which the ejection operation begins and at which the blow molding mold is ready to receive the preform, and compare that actual position to a predetermined reference position. Other regulating devices detect the moment in time at which the reference volume to be stored is collected in the storage chamber, and compare that actual time to a set reference time. In the event of possible deviations of the actual values from the reference values, the delivery output of the extruder is altered, with the aim that in the next cycle the distance covered by the annular piston within the reference storage time should correspond to the reference value as accurately as possible. A disadvantage in that respect is that it is only in the next following working cycle that it is possible to check whether the desired result has actually been achieved, so that generally a plurality of cycles will be required in order to achieve a predetermined operating condition. The preforms which were produced before that time and thus also the finished hollow bodies will accordingly not be of the desired quality.

It is desirable, and known from German laid-open application (DE-OS) No 28 13 241 for the extrusion head to be of such a design configuration that the maximum volume of the storage chamber is somewhat greater than the volume which must be stored in the production of preforms. That means that the stroke movement to be performed by the annular piston for the production of a preform for a given hollow body is somewhat shorter than the maximum possible stroke movement which is predetermined by the storage chamber. In that connection, in known manner, the volume of the portion of material which is to be stored for the respective preform is adjusted by establishing, in the range of the maximum possible stroke, the limit positions of the stroke movement of the annular piston and thus its stroke which is therefore normally less than the maximum stroke. Accordingly it is possible to use the same head which represents a relatively expensive capital investment item, for different blow molding molds for which different preforms with different gross volumes are required. In the case of a deviation in respect of the delivery output of the extruder, that is to say if the volume to be stored is plasticised too early or too late, it is possible with such an extrusion head, at the reference or desired beginning of the ejection phase, for the piston generally to perform a stroke movement of the adjusted length, as the extrusion head has a compensating volume from which additional material can be taken if the delivery output is excessively low or in which excess material can be stored if the delivery output is excessively high.

It has been found that the known processes suffer from the disadvantage that the filling condition of the storage chamber is detected only once during a working procedure, without in that respect it being possible to ascertain the way in which a deviation which has possibly occurred came about. If for example the annular piston has not reached its reference position because for just a brief moment the extruder suffered from a drop in output, for example as a result of the granulate material failing to slide down in the proper manner in the associated filling hopper, then with the known regulating systems the delivery output of the extruder will be increased although the delivery output again corresponds to the reference value. The result of that is that in the next cycle the annular piston reaches its reference position much too early so that a plurality of interventions are required in order to stabilise the procedure. In addition, in known processes, the amount of material conveyed into the extrusion head during the ejection phase is not sufficiently taken into consideration so that the procedure does not adequately comply with the rising level of requirements in terms of accuracy of the hollow bodies to be produced.

The invention is accordingly based on the problem of providing a process for the production of hollow bodies of thermoplastic material by an extrusion blow molding procedure of the kind set forth in the opening part of this specification, which eliminates or at least markedly reduces the above-indicated disadvantages. In particular the invention seeks to improve the level of productivity of such machines so that as few hollow bodies as possible, which do not comply with the quality requirements, are produced. Furthermore the invention seeks to provide that the process according to the invention simplifies the setting-up operation, that is to say the operation of preparing a machine for the production of a given hollow body.

As a solution, the invention proposes that the operating conditions of the individual assemblies of an extrusion blow molding machine are detected and related to each other in a control and regulating device. Starting from the predetermined operating parameters comprising gross volume, cycle time and ejection time, the control and regulating device ascertains the reference values, which are required for a working cycle, in respect of the values which influence the extrusion procedure, namely the reference stroke movement for the annular piston, the reference delivery output of the extruder and the reference speed of the annular piston during an ejection phase, in accordance with the introductory comments above.

In the event of a deviation occurring, depending on the magnitude thereof, at least one operating parameter and/or a preset value for an operating parameter of the subsequent ejection process is varied, during the same working cycle, in such a way that substantially the predetermined gross volume of the preform is ejected.

For that purpose, at least once during the filling operation, the distance covered by the annular piston and the speed at which the annular piston is displaced by the plasticised material in the storage phase are detected and compared to associated reference values within the central control and regulating unit. In that situation, the speed of the annular piston during the filling operation is taken as a measurement in respect of the delivery output of the extruder. In that respect it will be desirable for the speed and the distance covered by the annular piston to be continuously detected in order to increase the level of accuracy, a plurality of times during the filling phase or at least over a part of the filling phase.

That procedure according to the invention, using simple means, provides for monitoring the procedure in respect of time of the working cycle of the extrusion unit and the delivery output of the at least one extruder which are reproduced by the distance covered and the speed of the annular piston, at least during a given period of the filling phase. Any deviations from the respective reference or desired values are therefore detected in good time so that it is possible to provide for early regulating intervention in relation to corresponding operating parameters.

Detecting the operating conditions in that way means that it is possible in an advantageous fashion to optimise the extrusion procedure so that in the same working cycle in which the deviation was detected, it is possible to intervene in the operating parameters in order still to produce a preform of the prescribed gross volume. In that respect, intervention in that way to adjust operating parameters should advantageously occur only up to a moment in time and in a manner such that it is possible for the effects of intervention still to be monitored in the same working cycle. In particular adaptation of the operating parameters will amount to ejection of a preform which is of the required gross volume with the greatest possible degree of accuracy, irrespective of the nature of a deviation and the moment in time at which it occurs, with the cycle time being unaffected or only slightly affected. That ensures a uniform degree of quality of the hollow body, with a high level of productivity.

In order to adapt required interventions in relation to operating parameters, it is possible to deal with not only the delivery output of the extruder but for example also the length of the stroke movement to be performed by the annular piston or the ejection speed of the annular piston in the subsequent ejection phase. The last-mentioned interventions afford the advantage that, in contrast to intervening in the extruder system which reacts relatively slowly, they have an effect directly on the respective ejection process, virtually without any time delay.

Another advantage is that the delivery output of the extruder is detected directly so that it is possible to recognise and maintain a stable operating condition thereof, which is generally desired. That avoids frequent interventions in relation to the operating parameters of the extruder so that the extruder can rapidly assume an advantageous mode of operation. In that respect it may be desirable for a variation in the delivery output of the extruder to be effected only when it exceeds an admissible deviation, over a given period of time. However, in the case of small deviations or short-term fluctuations in the delivery output of the extruder, which would also cause the ejected gross volume to deviate from the reference value thereof, it should optionally also be possible to intervene in relation to other operating parameters, by means of the control and regulating device according to the invention, so that nonetheless the required gross volume is ejected with the maximum possible degree of accuracy.

In that respect, in relation to small deviations or short-term fluctuations in the delivery output of the extruder or in relation to deviations which are found only just before the beginning of the ejection phase so that the effects of a change in the delivery output of the extruder can no longer be checked, the procedure may advantageously involve providing for an intervention to change the extent of the emptying stroke movement of the annular piston and/or the speed thereof during the ejection operation, in such a way that the required gross volume is produced. As those operating parameters can generally be reset quickly, it is particularly desirable in accordance with the invention for the distance covered by the annular piston and the speed thereof to be detected at least at the end of the filling phase or just before same, as it is to be assumed that the deviations in the delivery output of the extruder continue during the ejection phase and thus, using those detected values, it is possible to provide information about the further progress of the extrusion procedure, by reference to which the other operating parameters can be altered in order to produce a gross volume with the maximum degree of accuracy.

Thus it is possible for example, if the delivery output of the extruder is excessively low, to eject a correspondingly larger amount of material from the storage chamber, whereas if the delivery output of the extruder is excessively high, it is possible to eject a correspondingly smaller amount of material from the storage chamber. That can be effected at any event when, as already mentioned, the storage chamber is of a maximum volume which is greater than the reference volume to be stored for constituting a preform, in which case the reference length of the stroke movement of the annular piston is then also shorter than the maximum possible piston travel. That configuration affords the possibility, if the delivery output of the extruder is excessively high, of reducing the length of the piston stroke movement relative to the reference value in respect thereof, so that a smaller amount of material than the reference amount to be stored is also ejected from the storage chamber by the annular piston. In that case, that smaller amount of material, together with the amount of material which is conveyed into the extrusion head by the extruder during the ejection phase and which is now greater by virtue of the higher delivery output of the extruder, provides the amount of material required for a preform. The result of that is that a part of the stored portion of material still remains in the storage chamber at least during the subsequent filling phase.

Conversely, if the delivery output of the extruder is excessively low, material for forming the preform is additionally ejected from the supply of material in the storage chamber of the extrusion head by a corresponding increase in the extent of the emptying stroke movement of the annular piston. That additional material is of such a quantity that the overall amount of material ejected from the storage chamber, together with the amount of material which is plasticised by the extruder during the ejection phase and which is now reduced by virtue of the excessively low delivery output of the extruder, gives the amount of material required for a preform.

It is important in that respect that, when there are deviations in the delivery output of the extruder from the desired or reference delivery output thereof, not only is the position of the reference stroke movement of the annular piston displaced within the storage chamber which is of larger size, and the annular piston performs only that desired or reference stroke movement, but in addition the length of the stroke movement is also changed in order to compensate for the deviations in the delivery output of the extruder during the ejection phase.

The increase or reduction in length of the piston stroke movement, with the speed of the piston remaining unchanged, during the ejection operation, results in a variation in the ejection time. However, by a corresponding variation in the ejection speed it is possible to provide that the reference ejection time is maintained as accurately as possible. Intervening in that way in relation to the length of the stroke movement on the one hand and the speed of the annular piston during the ejection operation on the other hand means that it is possible to maintain both the required gross volume for a preform and also the cycle time. In addition, as the reference volume for the preform issues from the outlet opening within the prescribed reference ejection time, the discharge speed which is advantageous from the point of view of the thermoplastic material is achieved.

If, under the specified conditions, the speed of the annular piston, at which the emptying stroke movement is performed, is not changed and thus the period of time required for performing a shorter or a longer stroke movement is shorter or longer respectively than the reference time, with the delivery output of the extruder being detected, that must also result in a corresponding additional change in the emptying stroke movement so that the amount of material which is plasticised by the extruder in that time difference and which accordingly is greater or smaller than the amount of material plasticised under the desired or reference conditions is also compensated. That procedure admittedly results in a change in the cycle time of the extrusion system, which however is so slight that it can normally be tolerated, having regard to the small proportion of material which is supplied by the extruder during the emptying phase.

In the case of a discontinuously operating extrusion unit which has a wall thickness control means for influencing the wall thickness of the preform, in general the distance covered by the annular piston, during the ejection operation, is taken as a control signal for adjusting the means which influence the wall thickness of the preform. Frequently, the procedure is such that the set stroke movement is divided into a plurality of portions of equal size so that each portion of the stroke movement corresponds to a given portion by volume which issues from the extrusion head. When the annular piston is moving at a constant ejection speed, that portion by volume is made up of the stored volume corresponding to the portion of the stroke movement, and the corresponding fraction of the volume of material plasticised by the extruder during the ejection period.

So that each portion of the respective stroke movement of the piston again corresponds to a portion by volume of the same size, it is necessary for the wall thickness program to be respectively based on the length of the piston stroke movement which is altered by the intervention operations in accordance with the invention, and for that length to be divided into the same number of portions of the piston stroke movement. That ensures that associated with each point in the program of the wall thickness control means there is once again a discharged volume of the same size, so that there is no distortion in terms of the distribution of the wall thickness of the preform.

A corresponding point applies if the wall thickness control effect takes place in dependence on the ejection time. In that case the respectively altered time of the ejection phase would have to be based on the wall thickness program. However that time-dependent control of wall thickness is not conventional practice in relation to the discontinuous production of preforms.

By virtue of the presence of a central control and regulating unit which is provided with a suitable computer, it is possible to monitor the entire operating procedure of the extrusion system; the computer computes from the detected operating data the respective changes which arise out of the respective deviations from the reference condition and which are required in order to obtain the desired operational result. In particular that is achieved by monitoring the operating condition of the extruder during the filling phase, whereby deviations can be detected in good time and suitable steps can be initiated. The changes may serve to eliminate the respective deviation from the operating condition, for example in regard to the delivery output of the extruder, as quickly as possible and as extensively as possible. However it is also possible to operate in such a way that the deviation is compensated by a change in another operating parameter, for example by altering the length of the stroke movement of the annular piston associated with the storage chamber, and/or the speed of the annular piston, during the ejection phase.

Figure 2:
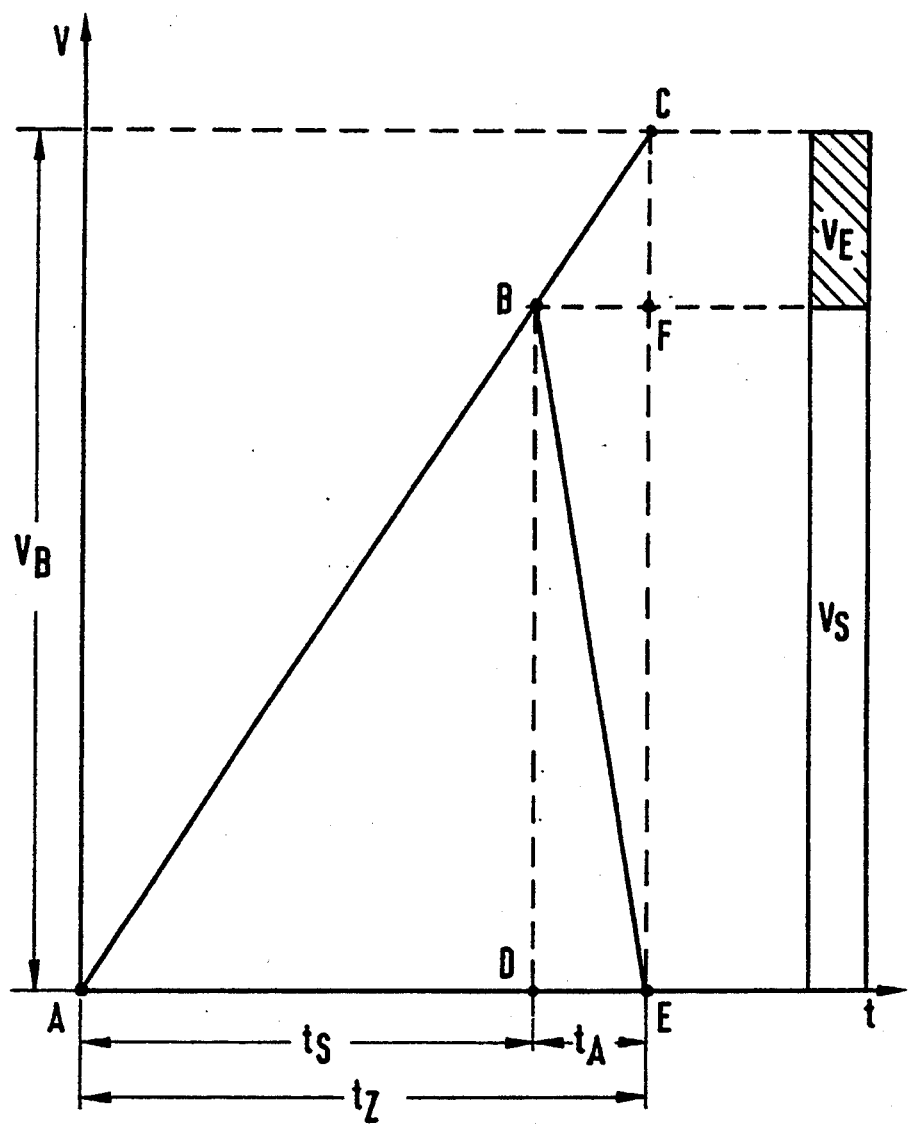
Figure 3:
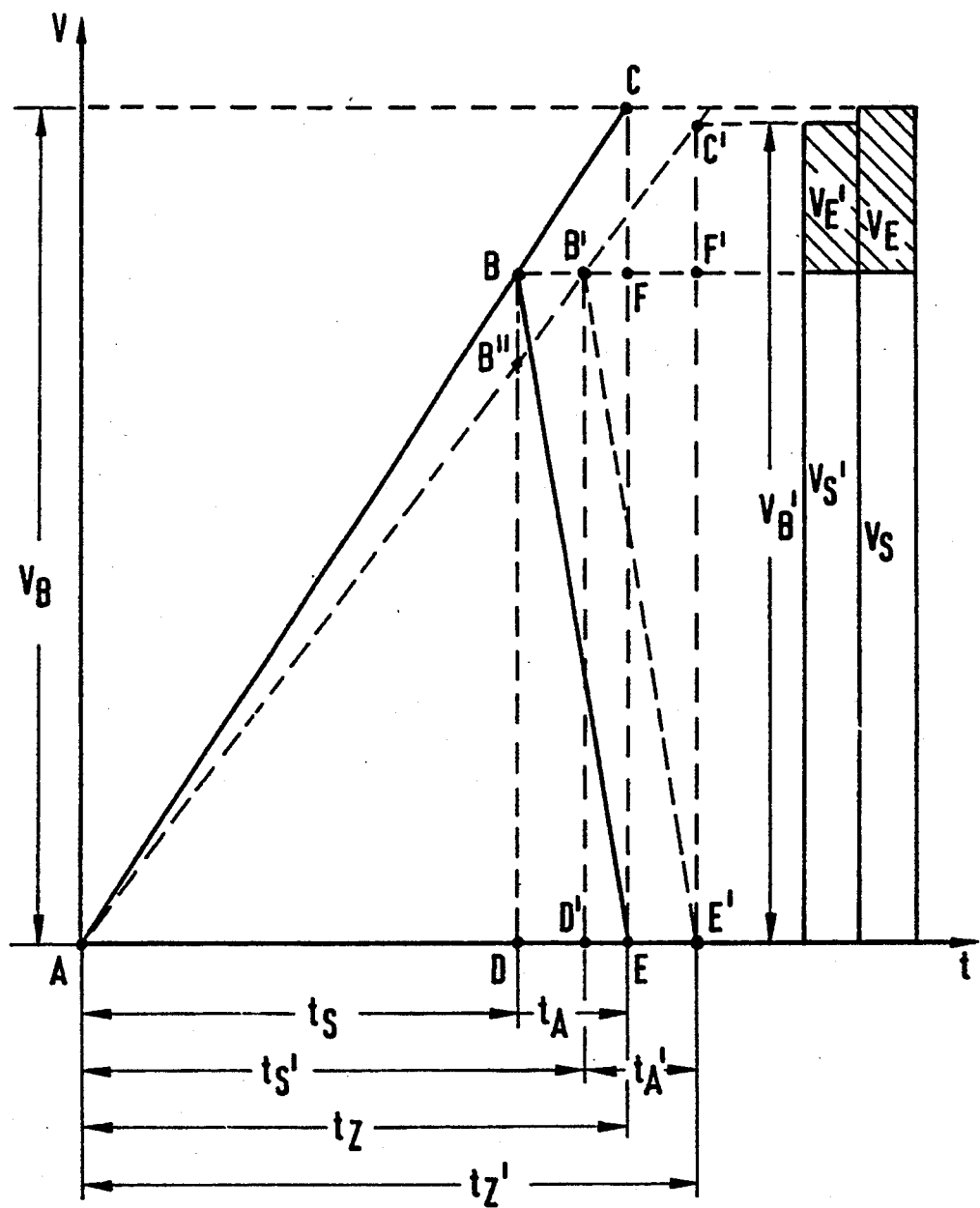
Figure 4:
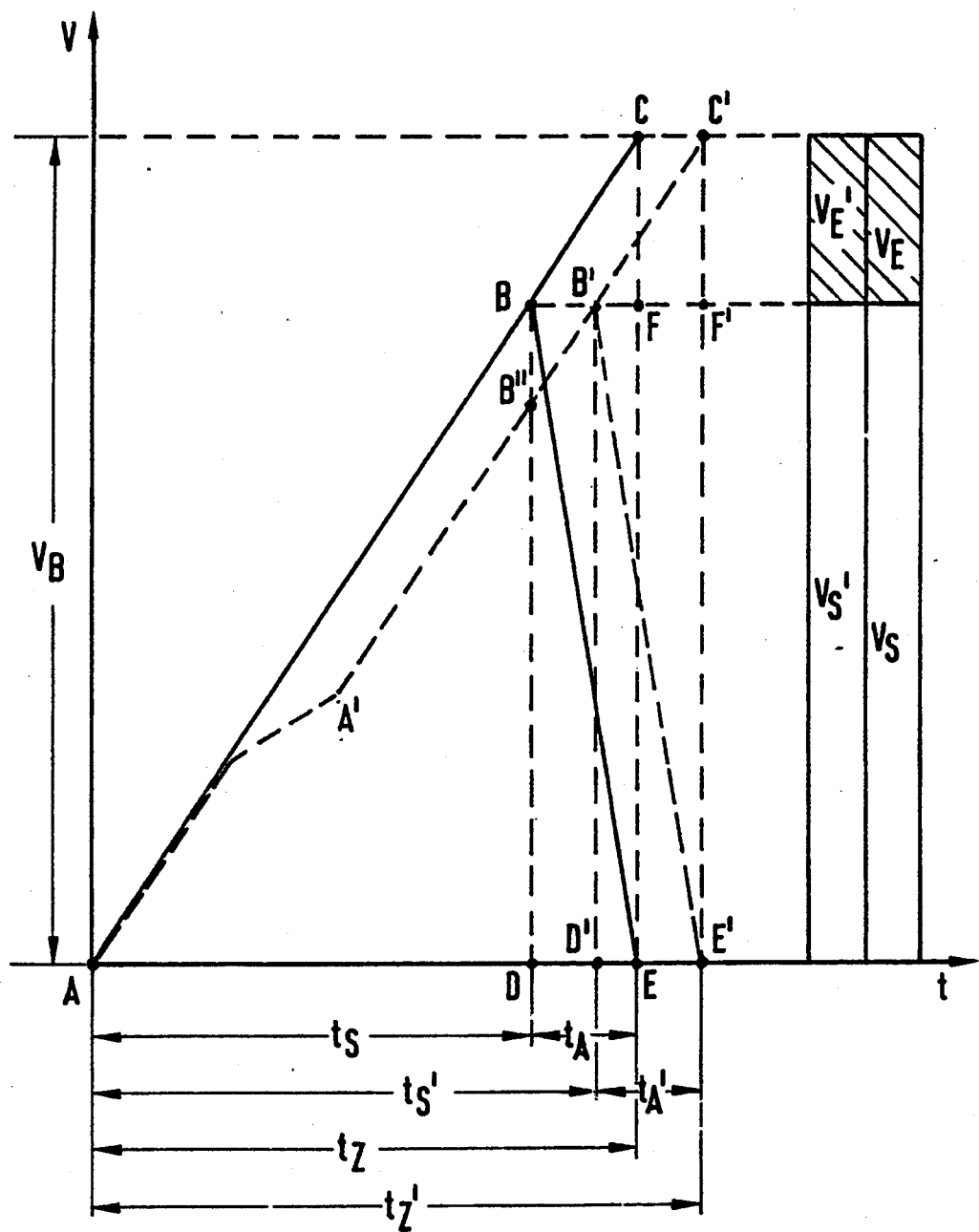
Figure 6:
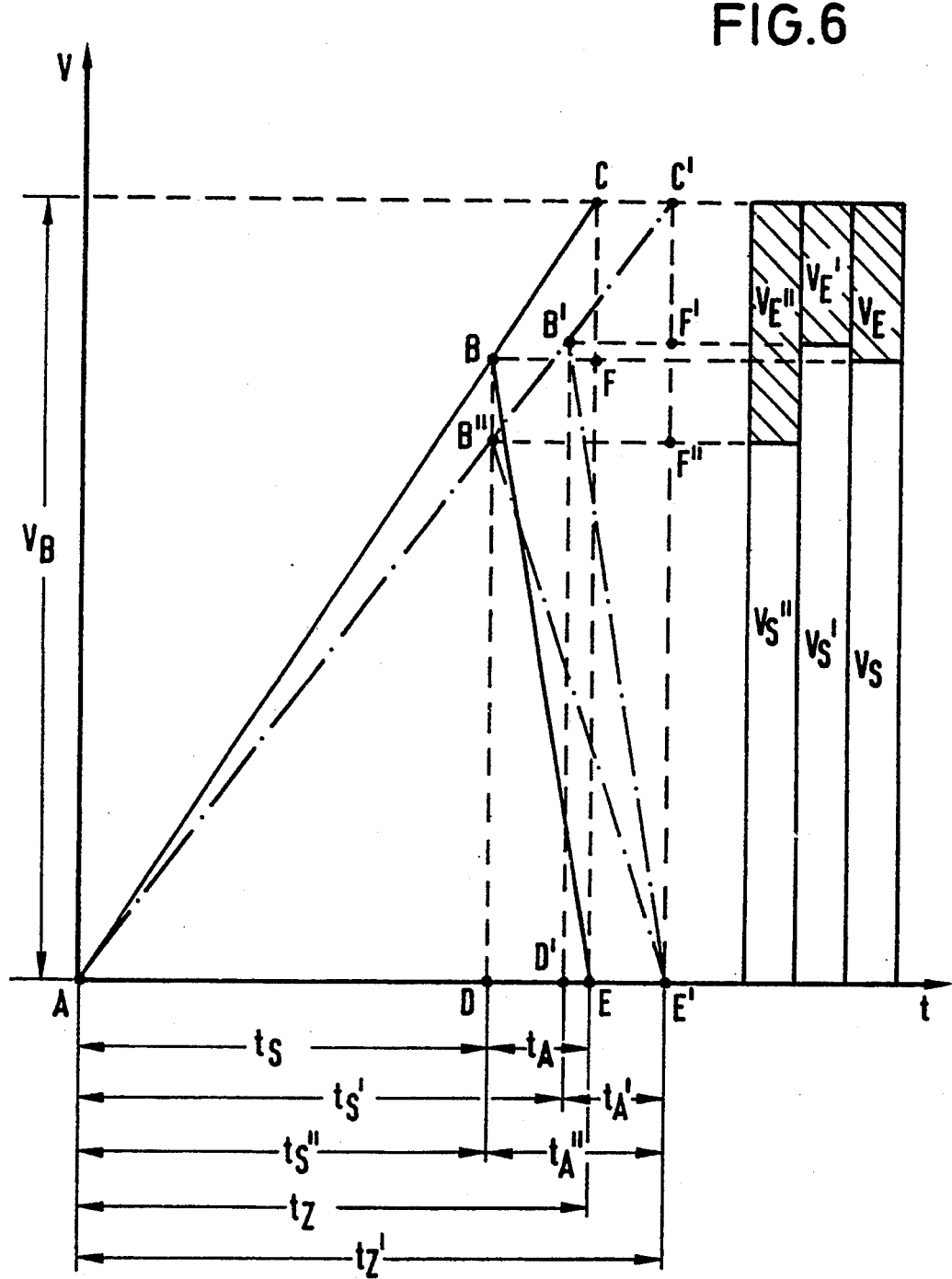
Figure 7:
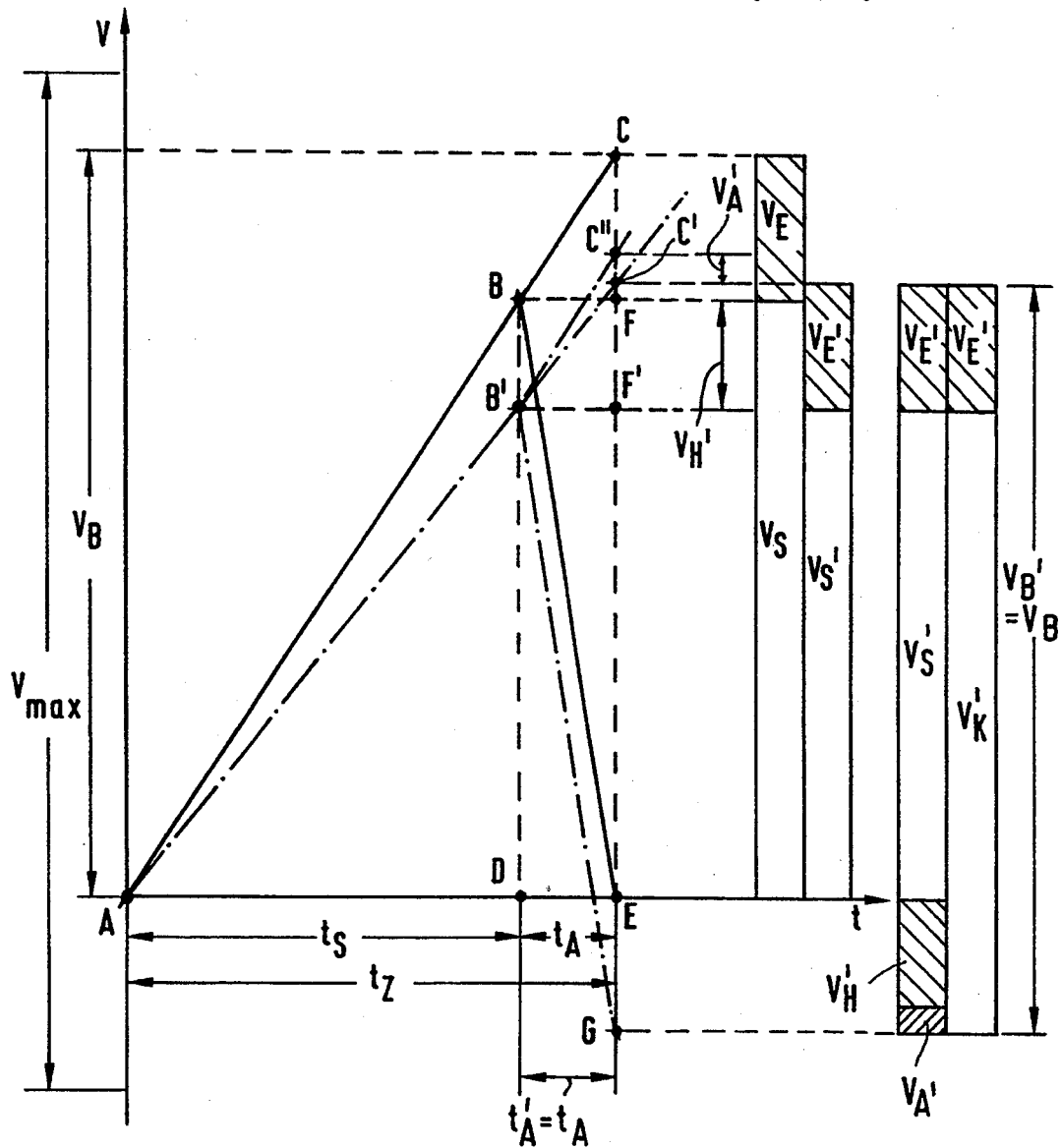
Figure 8:
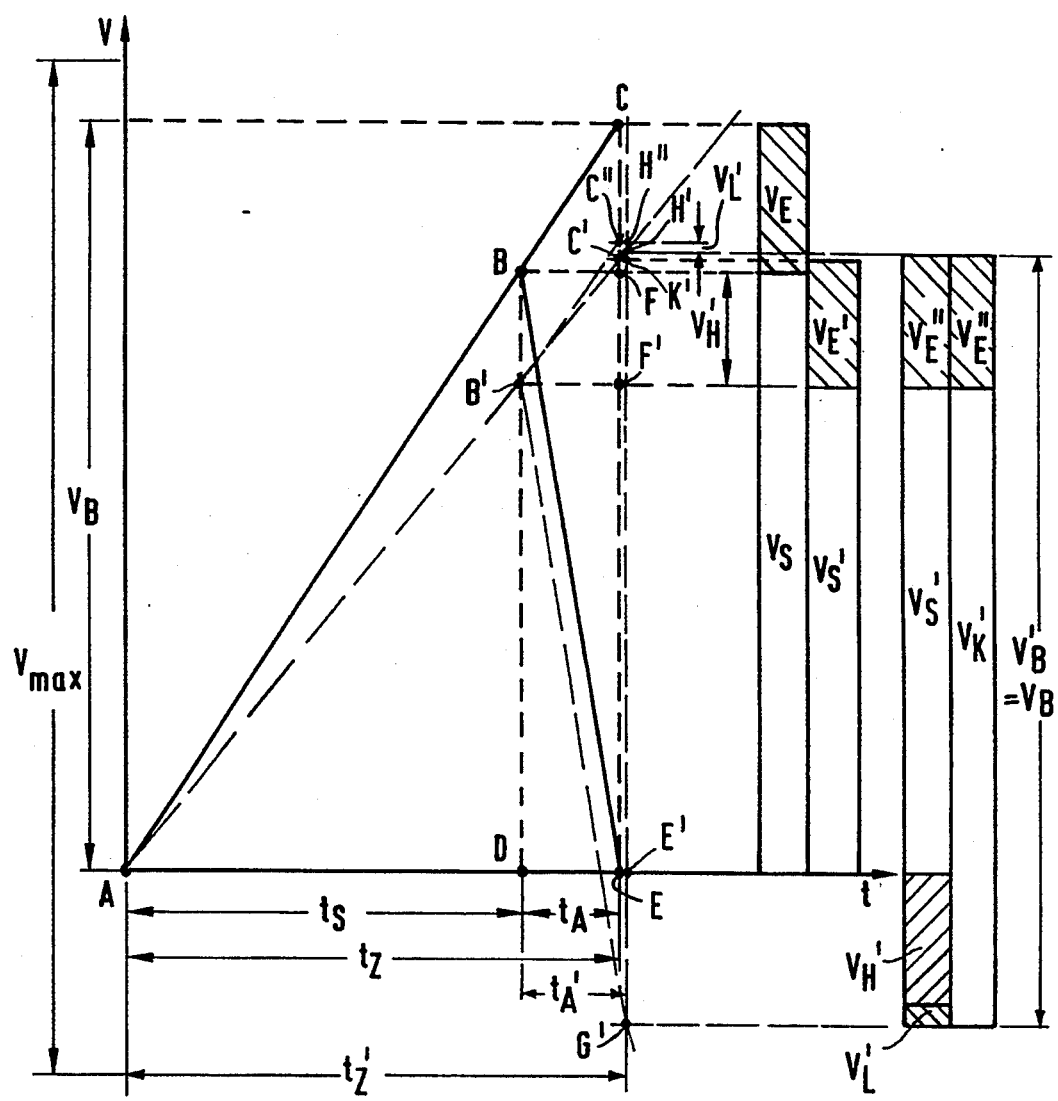
Figure 8A:
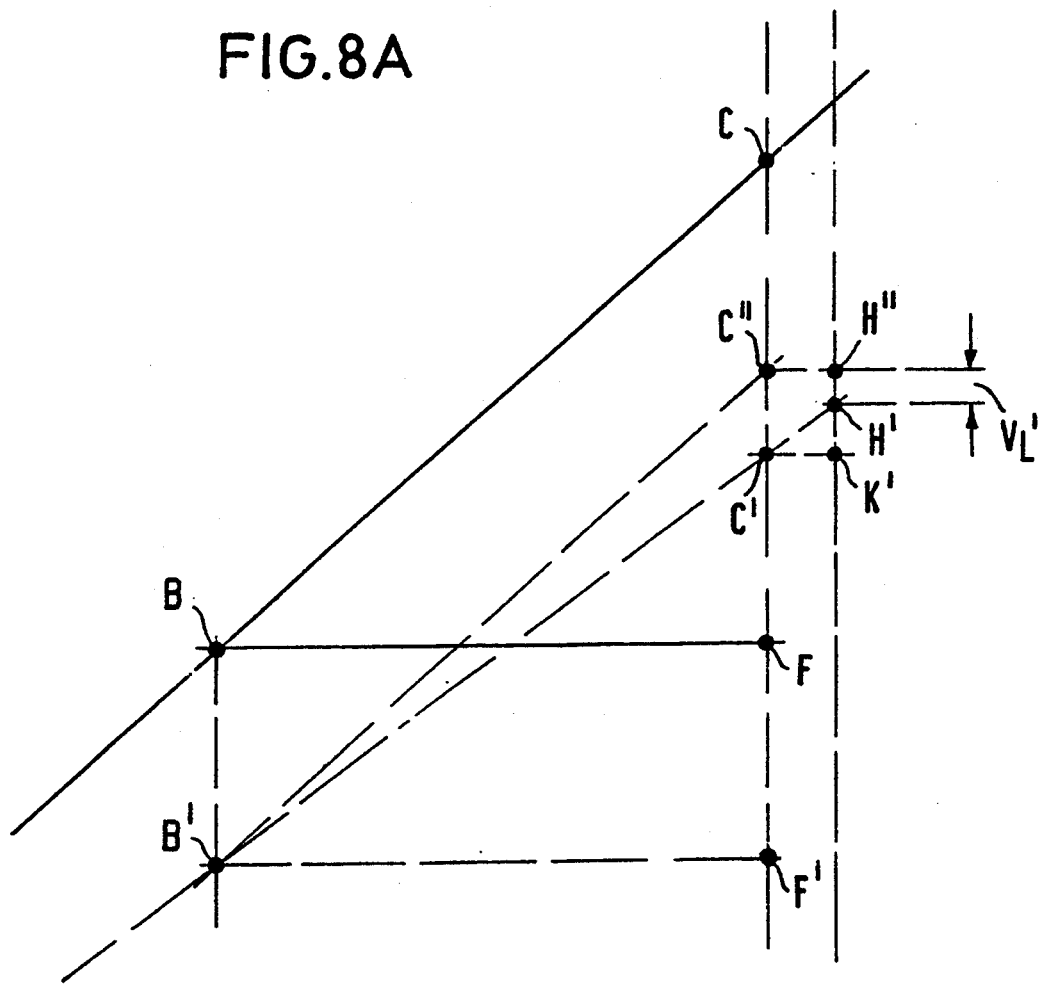
Figure 9:
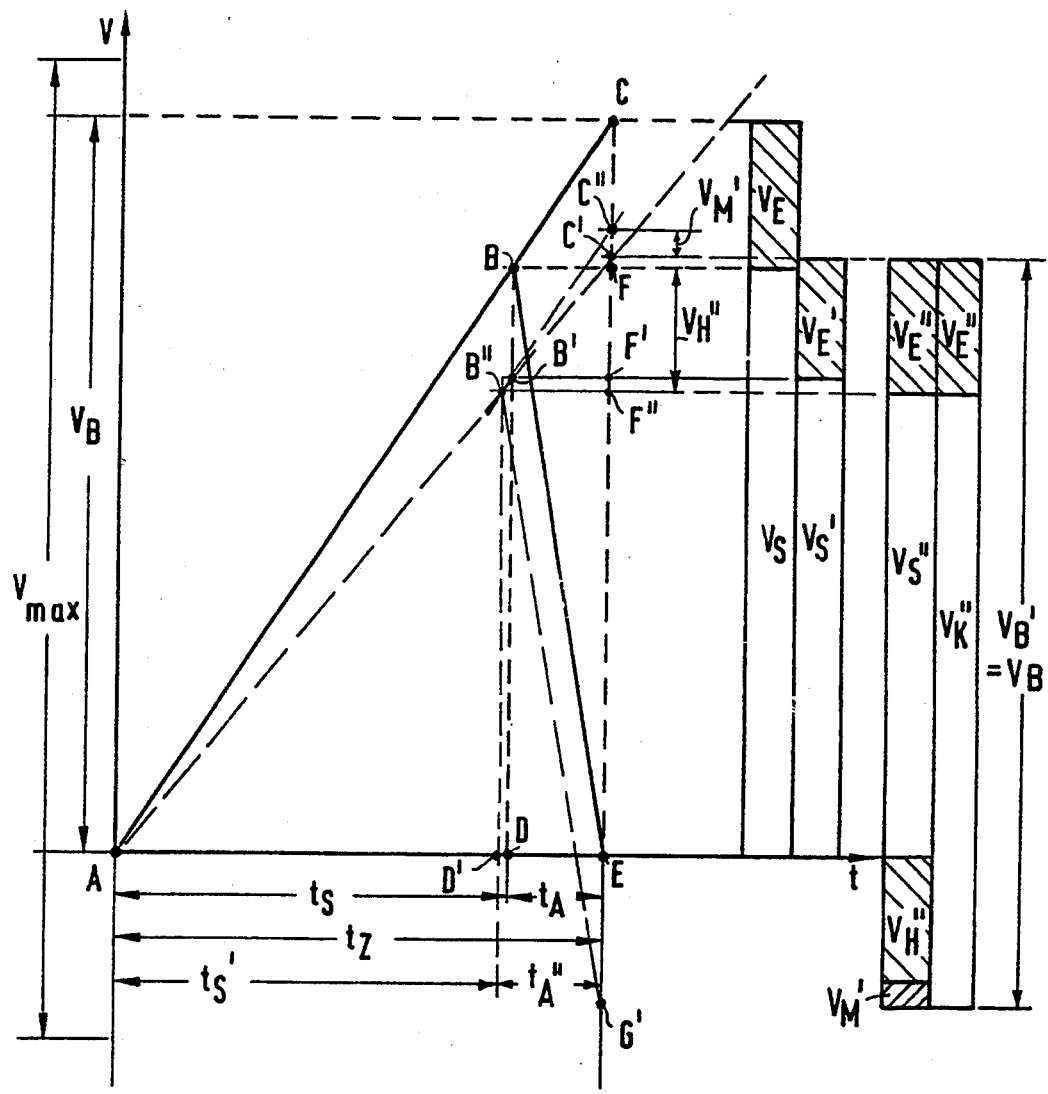
Figure 10:
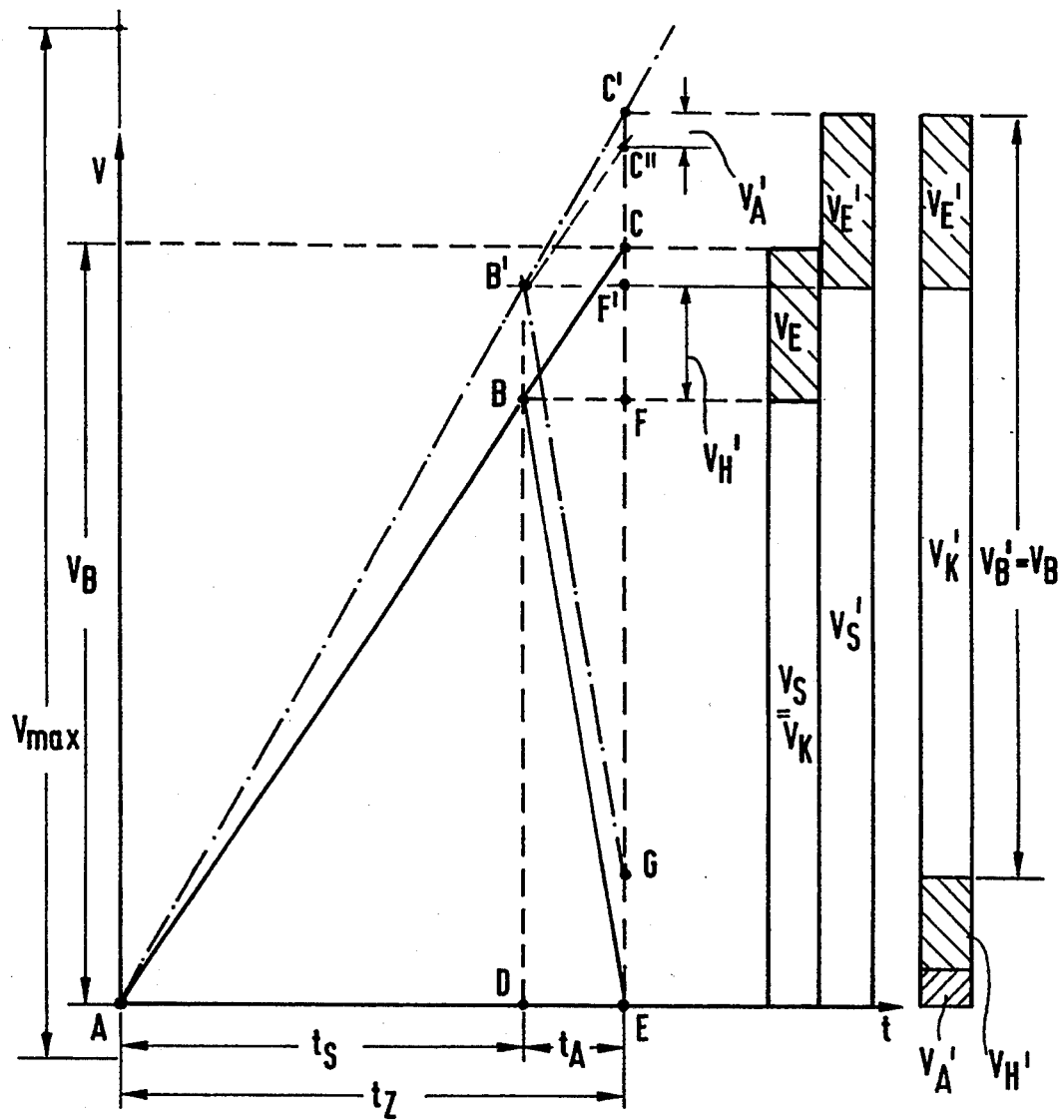

The way in which certain intervention operations in accordance with the invention can be effected is described hereinafter with reference to the drawings and in particular with reference to the volume-time graphs (V-t-graph) of the working cycle of a discontinuously operating extrusion unit. In the drawings:

FIG. 1 is a diagrammatic view of an embodiment of an apparatus for carrying out the process, FIG. 2 is a V-t-graph of an ideal working cycle, FIG. 3 is a V-t-graph with a deviation from the ideal working cycle, FIG. 4 is a V-t-graph with another deviation from the ideal working cycle, FIGS. 5–8 are each a V-t-graph in which the effects of different intervention possibilities according to the invention are shown, FIG. 8A shows a portion from FIG. 8 on an enlarged scale, and FIGS. 9–10 are each a V-t-graph showing the effects of further intervention possibilities in accordance with the invention.

The apparatus which is shown diagrammatically in FIG. 1 of the drawing, for the production of hollow bodies from thermoplastic material by means of extrusion blow molding, comprises an extrusion unit 2 and a blow molding unit 4. The extrusion head 9 of the extrusion unit 2 substantially comprises a housing 15, a stationary bar or mandrel 16, a core 17 which is arranged displaceably coaxially therein, and a piston 19 of annular configuration which is axially movable in a storage chamber 18. At its lower end 14 the core 17 represents the inner boundary of an outlet opening 20 which is in the form of an annular gap. In the other end region the core 17 is provided with a piston 21 guided within a cylinder 22. The feed and discharge lines for the generally hydraulic operating medium are identified by references 23 and 24. The piston 19 is connected to the piston rod 26 of a piston 27 by means of rods 25 or the like which are arranged distributed around the periphery of the piston 19. The piston 27 is arranged slidably in a cylinder 28. Feed and discharge lines 29 and 30 are provided for the normally hydraulic operating medium.

Disposed upstream of the extrusion head 9 is an extruder 10, the screw 11 of which is driven by a motor 12. The thermoplastic material which is generally in granulate form is fed to the extruder 10 by way of a hopper 13. The extruder 10 opens into an intake opening 37 of the housing 15 of the extrusion head 9. In that arrangement the plasticised material is put into an annular cross-sectional shape by two mutually oppositely disposed, downwardly enlarging ducts 32 and flows into the storage chamber 18 by way of an intermediate duct 33 which is formed by the mandrel 16 and the movable annular piston 19.

Arranged beneath the extrusion head 9 is the blow molding unit 4 having a blow molding mold 34 comprising two mold halves 34a and 34b. Associated with the blow molding mold 34 is a mandrel 35 which serves to supply a pressure medium, for example compressed air, by means of which the preform 31 is expanded, to correspond to the contour formed by the mold cavity of the blow molding mold 34 when closed. The pressure medium is supplied by way of a bore 36 in the mandrel 35. To provide for the movement of the mold halves, associated with the mold half 34b is a drive piston 49 which is slidable in a cylinder 48. Known synchronisation means provide that the blow molding mold halves 34a and 34b can move uniformly towards the preform 31. The synchronisation means are not shown for the sake of clarity of the drawing, especially as they are familiar to any man skilled in the art. It is also conventional practice for each blow molding mold half 34a and 34b to have its own drive means 48, 49 associated therewith.

For the purpose of carrying out the process according to the invention, there is provided a control and regulating device, the central computing unit of which is identified by reference numeral 66. In that unit, which can be for example a microcomputer, the detected operating conditions are evaluated or assessed and any adaptations in respect of the operating parameters of the extrusion and blow molding unit are prescribed.

In order to detect the distance covered by the annular piston 19, the assembly has a position sensor 64 with a position indicator 39 which can be for example in the form of a potentiometer. The position sensor 64 is connected by way the line 56 to the central control and regulating device 66 in which the actual position of the annular piston 19 is compared to the reference position thereof, and evaluated. The instantaneous speed of the annular piston 19 is ascertained from the position signal 56 in the conversion unit 68, and inputted by way of the line 69 to the central unit 66 in which the actual speed is compared to the predetermined reference speed both during the filling phase and also during the ejection phase. In accordance with the introductory discussion, those operating parameters represent the essential control parameters of the extrusion procedure as the progress in respect of time of the procedure can be ascertained by means thereof. The speed of the annular piston 19 during the filling phase is thus taken as a measurement in respect of the delivery output of the extruder 10, the drive motor 12 of which is connected to a regulating device 80 which in turn is connected by way of the line 81 to the central unit 66.

For the purposes of influencing the wall thickness of the preform, the extrusion unit 2 has a movable nozzle core 17 whose movements are regulated during the ejection operation by a programmer 53. The core 17 is moved in dependence on the stroke movement of the annular piston 19, in accordance with the program represented by the curve 54. For that purpose the assembly has a valve 63 which co-operates with the feed and discharge lines 23 and 24 of the piston-cylinder unit 21, 22. The regulator 60 compares the actual position of the core 17, which is detected by way of the position indicator 57 and the position sensor 58, to the reference position thereof which is prescribed by the wall thickness program, by way of the line 61. The stroke movement of the annular piston is inputted to the wall thickness programmer 53 by the position sensor 64 by way of the line 56.

For the purposes of checking the prescribed final length of the preform 31, the assembly may have for example at least one light barrier arrangement 38 in order for example to be able to establish whether the preform has suffered from an increase or a reduction in its length, as a result of the properties inherent in the plastic material. The at least one light barrier arrangement is connected by way of a line 52 with a regulating device 55 and the wall thickness programmer 54 whereby for example it is possible to produce an adjustment in the wall thickness program for the purposes of influencing the ejected length of the preform 31 without the gross volume of the preform 31 being varied. The wall thickness programmer 54 and the central control and regulating unit are connected together by means of the lines 76 and 77 so that the program procedures can be adapted to each other in the event of possible mutual influences, for example by virtue of a variation in the stroke movement to be performed by the annular piston 19.

During the ejection operation the reference ejection speed of the annular piston 19 is set by way of a valve 87 which co-operates with the piston-cylinder unit 27, 28 of the drive means for the annular piston 19. For that purpose the valve 87 is connected to a control unit 89 which receives its input signal from the central unit 66 by way of the line 88. In that arrangement the speed of the annular piston 19 is detected by the position sensor 64 and inputted to the central control unit 66 by way of the conversion unit 68. It is also possible however to provide a separate speed measuring device.

The length of the stroke movement to be performed by the annular piston 19, which determines the volume to be ejected in regard to the material stored within the storage chamber 18, can be established by the adjusting device 85 which, in dependence on a signal outputted by the central control and computing unit 66 by way of the line 83, sets the stroke travel of the annular piston 19 and the resulting limit positions 40 and 41 in respect of the piston stroke movement.

The movements of the blow molding unit 4 are monitored and set by a control unit 70 which prescribes the cycle time, the cooling time and other necessary times of the blow molding unit. In that connection, the signals for controlling the movement are supplied by way of a line 65 to the control device 44 which is connected to a valve 45 for the feed and discharge lines 46, 47 of the associated piston-cylinder unit 49, 48. The respective position of the blow molding mold is inputted to the control unit 70 by way of a position sensor 73 which can be in the form of a potentiometer.

The control unit 70 co-operates by way of the lines 71 and 72 with the central regulating and control unit 66 for the extrusion process. In particular, the cycle time to be observed and the moment in time at which the blow molding mold 34 is ready to receive a preform are preset by the control unit 70 by way of the line 71 for the central control and regulating unit 66.

For the purposes of monitoring the weight of the ejected preform, the arrangement includes a weighing device 91 with which the expanded hollow body with the waste or flash portions thereon can be weighed. The weighing device 91 is connected to a comparison device 93 in which the actual weight is compared to the reference or desired weight which is prescribed by the presetting unit 95. The weight monitoring operation may be effected for example in relation to each preform produced, although it may also be sufficient to measure only the weight of one preform out of a plurality of preforms which have been produced in successive working cycles. The reference value in respect of the preform weight is inputted to the central control and regulating device 66, after conversion in a conversion unit 97 into a gross volume. The comparison device 93 is connected to the conversion unit 97 by way of a line 96 so that, in the event of deviations in the weight of the preform, the conversion can be corrected. The conversion operation takes account of the density of the respective plastic material, without the value characterising the density of the material having to be known in terms of an absolute parameter.

FIG. 2 shows the ideal configuration of a working cycle of an extrusion unit of the kind described in the introductory part hereof. The ordinate identified by V represents the plasticised volume of the plastic material. The various portions in respect of time of the working procedure of an extrusion process are plotted on the abscissa which is identified by t. By virtue of the fixed geometry of the storage chamber and the annular piston within the extrusion head, it is possible for a stroke movement produced by the annular piston to be directly associated with a volume so that, with a suitable choice of scale, the stroke movement of the annular piston can also be read off on the ordinate. Accordingly the curve configuration corresponds to the movements of the annular piston, which are used as the decisive monitoring parameter in respect of the entire working cycle. The advantage of representing the volume can be considered to lie in the fact that, beside the movement of the piston, the volume of the material extruded during the ejection phase as well as the delivery output of the extruder are also shown.

The boundary or limit conditions for the extrusion procedure are defined by the required gross volume $V_B$ (distance EC) for a preform on the one hand and the time $t_Z$ (distance AE) for a working cycle on the other hand.

In accordance with the introductory discussion herein, an advantageous discharge speed for the plastic material from the outlet opening during the ejection operation can be determined from the identifying parameters of the extrusion head and the plastic material. That, with the overall volume $V_B$ to be ejected, gives the ejection time $t_A$ (distance DE) as a further prescribing parameter. All further reference values for the extrusion procedure can be ascertained with those prescribing parameters $V_B$, $t_Z$ and $t_A$.

The delivery output of the continuously operating extruder can be seen from the gradient of the line AC in FIG. 2 as the gross volume $V_B$ for a preform must be plasticised by the extruder within the time of a working cycle $t_Z$. Both the reference speed and also the reference position of the annular piston during the storage phase can be deduced from the configuration of the line AB. Thus, during the storage phase, the delivery output of the extruder can be monitored continuously or at given moments in time, by detecting the speed of and-/or the distance covered by the annular piston. In the ejection phase (distance DE) on the other hand the delivery output of the extruder cannot be ascertained by means of the speed and/or position of the annular piston.

The portion of the overall volume $V_B$ which must be collected in the storage chamber during the filling phase can be calculated from the cycle time $t_Z$ and the ejection time $t_A$. The ratio of the volume $V_S$ to be stored (distance DB) to the gross volume $V_B$ (distance EC) corresponds to the ratio of the storage time $t_S$ (distance AB) which results from the difference between the cycle time $t_Z$ and the ejection time $t_A$, relative to the cycle time $t_Z$ (distance AE). Accordingly the following relationship applies:

$$\frac{V_S}{V_B} = \frac{t_Z - t_A}{t_Z}$$

so that:

$$V_S = V_B \cdot \frac{(t_Z - t_A)}{t_Z}$$

In that situation the distance DE also corresponds to the reference stroke movement of the annular piston. The reference speed of and the distance to be covered by the annular piston during the ejection phase can be deduced from the configuration of the line BE.

As generally the required gross volume of a preform is determined under other conditions, in particular in regard to the pressure obtaining, the compressibility of the plastic material means that it is necessary to take account of the pressure conditions obtaining in the storage chamber, the parameters of the material, and other influencing parameters, in applying the foregoing relationship concerning the respective volume of the material used. As however those influencing parameters are primarily related to each other in a more or less constant relationship, the difference resulting therefrom, between the gross volume of a given mass in the extrusion head on the one hand and the gross volume of that mass in the finished article on the other hand remain disregarded in the discussion in principle which is set forth herein.

As however that difference cannot be satisfactorily determined in a practical context, the overall weight of the preform is taken as a preset value for the gross volume $V_B$, by the weight being converted with a given conversion factor into the gross volume. The weight of the overall material to be ejected can be ascertained after a working cycle by weighing the expanded hollow body, together with the waste portions of material; if the weight is excessively high, the gross volume to be used is reduced while if the weight is excessively low, the gross volume to be used is increased, it being presupposed that the extrusion process produced the respective underlying gross volume in question.

It can further be seen from FIG. 2 that the preform which is produced in a working cycle, of the gross volume $V_B$, is made up of the portion of material $V_S$ (distance DB or EF) which is collected in the storage chamber during the storage time $t_S$, and the portion of material $V_E$ (distance FC) which is conveyed into the extrusion head by the at least one extruder during the ejection phase.

It can be seen from the graph and the mode of operation of such extrusion units, which was described above, that the gross volume, cycle time and ejection time represent presetting or prescribed parameters which, in order to carry out correction operations, cannot be varied or can be varied only within narrow limits. Correction operations, during a working cycle, can concern the delivery output of the extruder, the length of the stroke movement of the annular piston and the speed thereof during the ejection operation.

FIG. 3 shows a deviation from the delivery output of the extruder. Hereinafter operating conditions which deviate from the reference configuration are identified with ' or ". In this example, a smaller amount of material per unit of time is plasticised by the extruder. The result of that is that the set volume $V_S$ of the material to be stored will also be attained at a later moment in time D'. At that later moment in time the material is displaced from the storage chamber at the set speed of the annular piston so that the reference ejection time $t_A$ is maintained, although with a time shift ($t_A'$) as the stroke movement to be performed by the annular piston and the ejection speed thereof remain unchanged. The result of that is that, due to the lower delivery output of the extruder during the ejection phase a smaller volume of material $V_E'$ (distance F'C') is conveyed into the extrusion head and accordingly the ejected volume $V_B'$ is smaller than the reference volume $V_B$ of a preform. In addition, that will result in a longer cycle time $t_Z'$ (distance AE').

In order to avoid misunderstanding, it will be pointed out at this stage that the illustrated V-t-graphs only reproduce the qualitative configuration of an extrusion procedure. Therefore, on the basis of the selected divisions of the axes of the co-ordinate system, the deviations in volume may be very small and may thus appear insignificant. It is apparent however that even just small deviations in volume in respect of the ejected material may give rise to variations in the length of the preform which for example may considerably displace the distribution in terms of wall thickness, with respect to the longitudinal extent of the preform, so that the finished hollow body does not exhibit the desired distribution of wall thickness. The modes of operation involved are only to be described in principle, by reference to the illustrated examples.

Known apparatuses generally ascertain either the time difference (distance DD') between the reference time and the actual time at which the material to be stored is collected in the storage chamber, or, at the reference moment in time D at which the stored material is to be ejected, the position B" of the annular piston, and compare same to a reference position B. On the basis of the result of the comparison operation, intervention is initiated, which in this case causes an increase in the delivery output of the extruder. In that connection, such intervention will only be able generally to produce its effect in the following working cycle, due to the slow reaction on the part of the extruder, so that at least in this cycle a preform is produced, which does not comply with the desired requirements. There is also the disadvantage that the effect of the intervention can be monitored at the earliest at the end of the storage phase in the next cycle.

FIG. 4 shows a failure in delivery output of the extruder, which lasts only for a short time and after which the extruder regains its reference delivery output. Such a variation in the delivery output of the extruder may be caused for example by the plastic material in granulate form suffering from a delay in slipping further down in the filling hopper towards the extruder. As shown, the volume to be stored will first be stored in the storage chamber at a later moment in time D'. As in this case the delivery output of the extruder again corresponds to the reference value after just a short period of time, and thus the line A'C' extends parallel to the line AC, the required volume $V_E$ is conveyed into the extrusion head by the extruder during the ejection phase (distance D'E'), so that the required gross volume is in fact ejected, although at a later moment in time (E').

However, in this case also known regulating devices ascertain either the difference between the reference time and the actual time (distance DD') at which the volume of material to be stored is in fact stored, or the difference between the reference position of the annular piston and its actual position (distance BB") in which it is disposed after the reference storage time D. The result of that is that in this example also the delivery output of the extruder is altered by a regulating intervention, although it has returned to its reference value again after only a brief deviation, with the result that the next working cycle involves conditions which constitute a deviation from the reference operating condition and which result in a defective preform.

The examples in FIGS. 3 and 4 show that extrusion processes with known regulating and control devices which only ascertain the operating condition once per cycle, at least within the working cycle in which the deviation has occurred, provide a preform which is produced in a cycle time which deviates from the reference cycle time, and that preform is possibly of a gross volume which deviates from the reference value. In addition, such regulating and control devices provide intervention operations which result in a change in an operating parameter at the earliest in the next working cycle so that the effects thereof can only be ascertained in that cycle. Accordingly, it may happen that intervention operations were no longer required, at the moment in time at which they were initiated. Erroneous interventions in that way in the extrusion procedure are in particular to be attributed to the fact that, throughout the entire storage phase which is generally longer than the ejection phase, and which in many cases can even last for up to 90% of the cycle time, none of the decisive operating parameters and in particular the delivery output of the extruder and the position of the annular piston are ascertained, evaluated and possibly altered. Generally therefore a plurality of working cycles are required in order to compensate for fluctuations which have occurred.

A regulating and control device according to the invention seeks to avoid the disadvantages of the known regulating devices, in that at least during a portion of the filling phase the speed of the annular piston is detected as a measurement in respect of the delivery output and/or the position of the piston and evaluated by the central regulating and control unit. Depending on the moment in time and the extent of any deviations from the reference condition, intervention operations are then initiated so that the required gross volume for a preform is ejected, with the greatest possible degree of accuracy. The invention further seeks to provide that the cycle time of the associated blow molding unit is maintained and observed. The procedure will now be described with reference to the following Figures, with the ideal configuration of FIG. 2 also being shown for comparison purposes.

Figure 5:
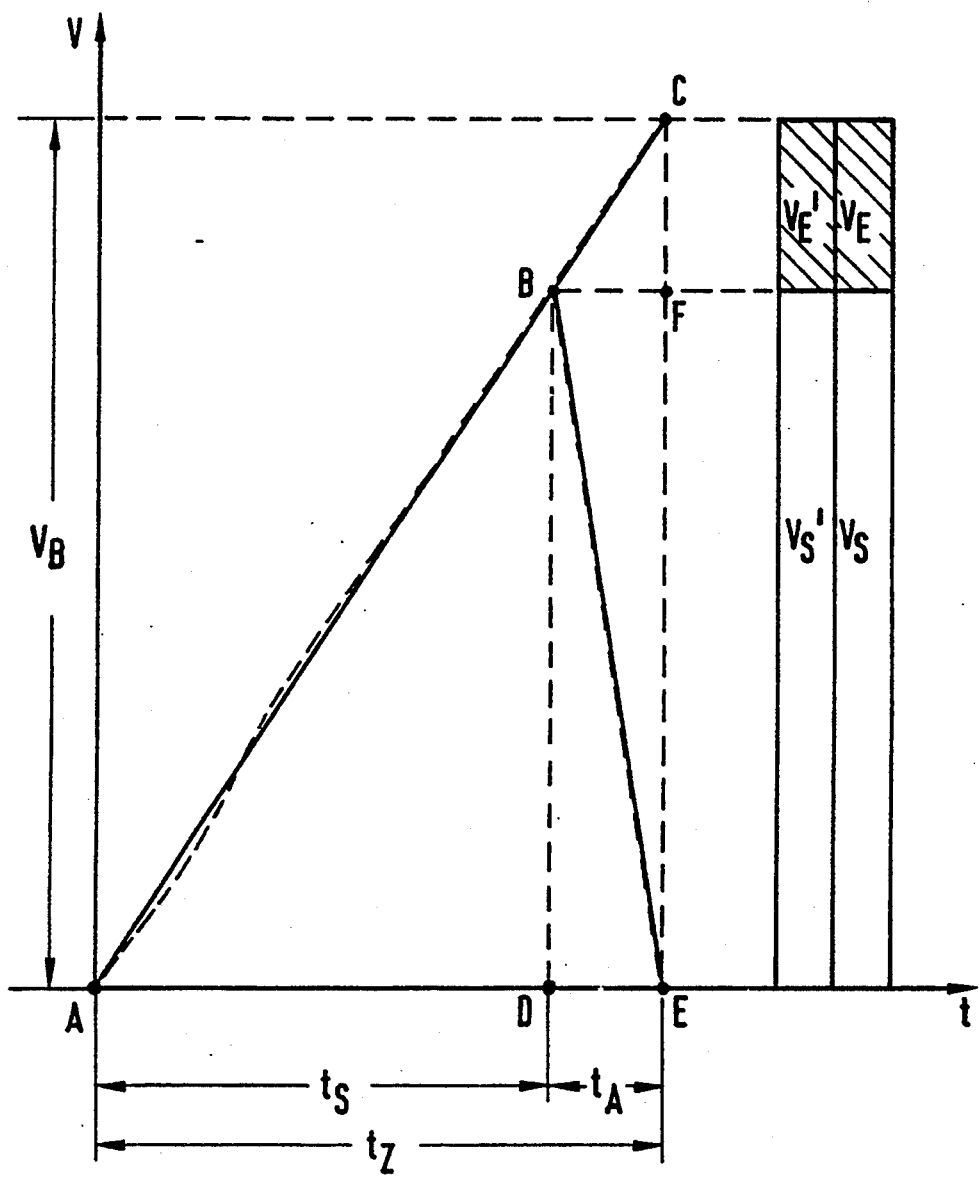

FIG. 5 represents movements of the annular piston which can occur when the delivery output of the extruder is regulated by a regulating and control device according to the invention. In that respect, the speed of the annular piston and the positions thereof are detected a plurality of times during the filling phase and evaluated in the control and regulating device, with the result that, in the event of possible deviations in respect of the extruder delivery output detected in that way, the delivery output is corrected. It is apparent that detecting the actual values in that way and comparing them to the reference values means that intervention operations can be carried out, which are still effective in the same working cycle and the effect of which can still be monitored therein. The result of that is that the end of the storage phase can be attained at the correct moment in time D, while the delivery output of the extruder which essentially corresponds to the reference value can also be set. As now any fluctuations in the delivery output of the extruder can only take an effect in the ejection phase and accordingly only in respect of the volume $V_E$ which is extruded during that period of time, in general the required gross volume $V_B$ can be ejected with a high degree of accuracy. At any event fluctuations which occur in the emptying phase are not of very great consequence in terms of quantity, and can therefore be tolerated in many cases.

It is known that a stable operating condition for an extruder depends on a number of influences so that generally even minor variations due to external interventions can result in compensating procedures occurring in the longer term. The endeavour will therefore be to avoid frequent interventions in regard to the operation condition of the extruder. Accordingly in many cases it may possibly be disadvantageous to regulate an extrusion process in such a way as to give a working procedure as shown in FIG. 5.

On the contrary it will often be desirable for interventions in the operating condition of the extruder to be initiated only when the deviations of the delivery output exceed a predetermined tolerance range. That may be the case for example when the extrusion unit is started up again after a break in operation, so that a stable operating condition in respect of all influencing parameters which have an effect on the delivery output of the extruder must first be attained. The deviations in the extrusion process, which occur until a stable operating condition is attained, can be compensated by varying other operating parameters. That is possible for the reason that monitoring the speed of the annular piston and the position thereof by the central control and regulating unit can provide information regarding the extent of the deviation during the on-going procedure and at the end of the extrusion process, and from that it is possible to derive intervention operations in relation to other operating parameters in order to eject the gross volume required for a preform. In that respect it is assumed hereinafter that the deviations in delivery output, which are set in the filling phase, continue in the ejection phase. Deviations which only occur in the ejection phase cannot be ascertained and accordingly cannot be evaluated.

FIG. 6, proceeding on the basis of a delivery output on the part of the extruder which is lower than the reference or desired delivery output, shows the effects of intervention operations which result in variations in the volume of the material to be stored and/or the speed of the annular piston during the ejection operation so that substantially the required gross volume is ejected. In regard to the first possibility which is identified by ' in FIG. 6, the volume of the material $V_S'$ to be stored is increased (distance D'B') in such a way that, during the ejection process and with the set reference ejection speed for the annular piston, the material $V_E'$ conveyed into the extrusion head by the extruder (distance V'C'), together with the material $V_S'$ stored in that working cycle, gives the required gross volume $V_B$. In that situation, there will be both a different moment in time for the commencement of ejection (D') and also a changed ejection time $t_A'$ as well as a different cycle time $t_Z'$. In addition it is necessary in that situation for a greater stroke movement than the reference stroke movement to be available for the annular piston within the storage chamber, so that the amount of material to be stored, which is increased in order to compensate for the deviating extruder delivery output, can be accommodated in the storage chamber.

In regard to the second possibility which is identified by ", from the reference commencement of ejection (D), the material which is stored up to that moment in time (distance DB") is displaced from the storage chamber, at a reduced ejection speed. That will accordingly give a longer ejection time $t_A''$, within which correspondingly more material (distance F"C') is conveyed by the extruder into the extrusion head, which, together with the material $V_S''$ which has admittedly been stored, gives the required gross volume $V_B$. A regulating procedure of that kind will be appropriate if a greater stroke movement on the part of the piston within the storage chamber is not available for compensating for the delivery output. In addition intervention in that way is possible only when the altered speed of discharge of the plastic material from the outlet opening during the ejection operation does not result in the preform being influenced in such a way as to suffer from a drop in quality. That regulating option also results in a change in the cycle time $t_Z'$.

Both of the possibilities shown in FIG. 6 will result in the occurrence of portions by volume $V_S'$ and $V_E'$, and $V_S''$ and $V_E''$ respectively, which differ from the reference portions by volume $V_S$ and $V_E$ respectively and which together give the required gross volume $V_B$. The compensating operations result in a variation in the cycle time and the ejection time. The working procedure of the blow molding machine, which takes place in parallel relationship, must possibly be adjusted thereto. It will further be apparent that the illustrated regulating option results in an increase in the length of the cycle time and thus only in a reduction in the level of productivity, although the preform produced thereby satisfies the desired requirements.

FIGS. 7–10 therefore show further regulating options which in the ideal case do not result in variations in the cycle time, while furthermore the required gross volume for a preform is ejected from the extrusion head. In accordance with the structural factors described in the introductory part hereof, it is generally conventional practice for the stroke movement to be performed by the annular piston and which determines the volume of the material to be stored to be less than the maximum possible stroke movement which is predetermined by the storage chamber, so that the volume to be stored only fills up a part of the maximum volume of the available storage space. In many cases the arrangement of the positions for delimiting the piston stroke movement in the storage chamber will be such that both in the ejection movement and also in the movement of the piston during the filling phase, the annular piston can cover a longer distance than the reference distance and can thus displace more material from the storage chamber than was delivered in the preceding storage phase, or more material may be collected in the storage chamber than is ejected. It is therefore possible for an amount of material $V_K$ to be ejected by the piston, which is not the same as the previously stored amount of material $V_S$. That additional volume represents a compensating volume or a reserve which can be used to compensate for deviations in the delivery output of the extruder.

FIG. 7 additionally shows on the ordinate a maximum volume $V_{max}$ in respect of the available storage space, within which the volume of the material to be stored is disposed.

Starting from an excessively low extruder delivery output, as shown in FIG. 7, the stroke movement to be performed by the annular piston in the subsequent ejection operation is so set that the material displaced from the storage chamber is made up of the portion by volume which was plasticised within the storage period in that cycle and which was conveyed into the storage chamber, and the portion by volume which is lacking at the end of the respective cycle, for the purposes of achieving the required gross volume $V_B$. The ejected volume for a preform is accordingly formed from the material stored in the cycle, the material delivered by the extruder during the ejection phase, and a compensating volume which is present in the storage chamber as a reserve, for example from preceding cycles.

The amount of material to be compensated can be ascertained from the illustrated curve configuration. At the end of the cycle time $t_S$ (moment in time E), a new preform is to be made available, with a gross volume $V_B$. According to the configuration of the delivery output (line AC') which is ascertained during the storage phase, in particular at the end thereof, the expectation is that, at the moment in time E, that is to say when all the preform is extruded, the extruder has plasticised only a volume of material which corresponds to the distance EC'. The volume of material which corresponds to the distance CC' is lacking and must be compensated for.

Up to the predetermined moment in time D, only the amount of material $V_S'$ (distance EF') was stored within the storage time $t_S$, as a result of the excessively low delivery output of the extruder. If the operation of emptying the storage chamber begins at the predetermined moment in time D, the volume $V_K'$ to be ejected from the storage chamber must be increased relative to the volume $V_S'$ stored in that cycle, by the amount missing in the delivery of the extruder, up to the end of the cycle (distance CC'), in order to obtain the full gross volume $V_B$ required.

At the moment in time D, the annular piston begins its ejection stroke movement in a position which corresponds to the point B'. When the piston performs the reference stroke movement, it would eject the volume $V_S$, in which case the missing amount of plastic material $V_H'$ (distance FF') must be taken from a reserve within the storage chamber. During the ejection phase the extruder plasticises the amount of material $V_E'$ (distance F'C') which, because of the deviation on the part of the extruder, is also less than the reference amount $V_E$. The line parallel to the reference or desired delivery (line AC), through the point B', produces on the ordinate EC an intersection point C'', the spacing of which from C' corresponds to the volume by which the delivery of the extruder fell short, as a result of its excessively low delivery output during the ejection phase. Therefore the reference volume $V_S$ to be stored must be increased by the volume $V_A'$ corresponding to the distance C'C'', by suitably increasing the length of the stroke movement of the annular piston relative to the reference ejection stroke movement.

That portion of material must also be taken from the reserve in the storage chamber. The sum of the missing material, which must be provided from the storage chamber, corresponds to the portions GE and FF' respectively, plus C'C'' or CC'. Therefore the stroke movement of the annular piston does not terminate at a position which corresponds to the point E but at the moment in time E at the lower point G.

Because of the greater required stroke movement for the annular piston, an increase in the speed of the piston is required if the gross volume for a preform is to issue from the opening of the extrusion head in the same period of time (ejection time $t_A$). Therefore the curve portion B'G is of a somewhat steeper configuration than the curve portion BE concerning the reference condition. The adapted speed of ejection of the annular piston provides at the same time that the appropriate speed of discharge for the plastic material is maintained, as the same amount of plastic material issues from the extrusion head in the same period of time.

FIGS. 8 and 9 which are described hereinafter, for the sake of enhanced comprehension, show the deviation illustrated in FIG. 7 as well as the deviating volumes $V_S'$ and $V_E'$ which would result from such a deviation.

FIG. 8 shows a regulating option in which the annular piston maintains its speed corresponding to the reference condition (gradient of the line BE) during the ejection phase. Because of the longer stroke movement, as a result of the volume $V_K'$ which is to be ejected from the storage chamber and which is increased by $V_L'$ (distance H'H''), there will be a longer ejection time $t_A'$. That increase in ejection time must be taken into consideration when arriving at the magnitude of the longer stroke movement and thus $V_L'$ as in that period of time material continues to be plasticised by the extruder (distance K'H') and issues from the extrusion head. Therefore, with the same deviation in respect of the delivery output, the compensating volume $V_L'$, as shown in FIG. 8, will be smaller than the compensating volume $V_A'$ as shown in FIG. 7, as a greater volume $V_E''$ is passed into the extrusion head, in the increased ejection time. The total volume of material plasticised by the extruder during the extended cycle time $t_Z'$ corresponds to the distance E'H'. As a result of the longer cycle time and the stroke movement to be performed, which with an excessively low delivery output is longer than the preceding stroke movement during the filling phase, the ejection stroke movement of the annular piston terminates at the moment in time E' at the lower position G'.

In a regulating situation as shown in FIG. 8, there will be a longer cycle time $t_Z'$. However that may be avoided by a regulation effect as shown in FIG. 9, with an unchanged speed for the annular piston during the ejection operation. In FIG. 9, the ejection operation already begins at an earlier moment in time D' which, together with an increase in the length of the stroke movement and thus an increase in the amount of material $V_K''$ to be ejected, is so selected that, in the ejection time $t_4''$ which is longer as a result, such an amount of material $V_E''$ is passed into the extrusion head from the extruder that the reference gross volume issues from the extrusion head. The total amount of material $V_B$ ejected is accordingly made up of the material $V_S''$ which was collected in the shortened storage time $t_S'$, the material $V_E''$ which was plasticised by the extruder in the extended ejection time $t_4''$, and the compensating volume $V_H''$ which corresponds to the insufficiently collected volume of material (distance F''F'), as well as the compensating volume $V_M'$ which corresponds to the material (distance C'C'') by which the output of the extruder fell short in the ejection phase. In that connection the point C'' corresponds to the point of intersection of a line parallel to the reference or desired delivery output line AC through the point B'' with the ordinate EC. The volumes $V_S''$ and $V_H''$ again together give the reference volume $V_S$ to be stored so that the annular piston only has to perform the reference stroke movement which is extended by a distance corresponding to the volume $V_M'$. That regulating option can be carried into effect only when the working procedure of the associated blow molding machine is not disturbed by the earlier commencement of the ejection operation.

It is self-evident that the illustrated compensating operations can also be correspondingly transferred to those deviations which are caused by an excessively high level of delivery output by the extruder. The example in FIG. 10 shows a uniformly excessively high delivery output from the extruder, corresponding to the line configuration AB'C'. At the end of the working cycle at the time E, the volume $V_B$ for a preform is once again to be ejected. As a result of the delivery output being higher than the reference delivery output (line configuration ABC), at the end of the cycle time the extruder has delivered a volume (distance EC') which is greater than the gross volume $V_B$ to be ejected for a preform.

The storage phase $t_S$ involved the collection of a volume $V_S'$ which is greater than the reference volume $V_S$ to be stored, by the volume $V_H'$ (distance FF'). The nature of the delivery output which is ascertained during the filling phase leads to the expectation that there is also an excess over the reference delivery in the ejection phase, up to the moment in time E. The excess portion $V_A'$ which is to be related to the ejection phase accordingly corresponds to the distance between the point C' and the point of intersection C'' of a line parallel to the reference delivery output line AC, through the point B', with the ordinate EC'.

If, at the moment in time D, the ejection operation begins from a position of the annular piston which corresponds to the point B', the length of the reference stroke movement must be reduced by a distance which corresponds to the volume $V_A'$ and which corresponds to the distance C''C', so that the required gross volume can be ejected. The amount of material which corresponds to the material $V_H'$ which was supplied in excess in the storage phase $t_S$ (distance BB'), together with the material $V_A'$ which was supplied in excess during the ejection phase $t_4$ (distance C'C'') must be temporarily put into the storage chamber.

Accordingly the gross volume $V_B$ to be ejected is made up of the material $V_E'$ (F'C') which is delivered by the extruder during the ejection phase $t_4$ and the amount $V_K'$ which is ejected from the storage chamber by the annular piston and which is smaller than the reference volume $V_S$ to be stored.

The result of the reduction in the length of the ejection stroke movement is that the speed of the piston must be reduced in order to attain the predetermined ejection time $t_4$. Therefore the portion of the curve B'G is somewhat less steep than the configuration of the portion of the curve BE in respect of the reference condition. The ejection stroke movement of the annular piston therefore terminates at the time E at the higher position G.

In regard to other regulating options, it will have to be noted that a compensating operation which is possibly required may result in a shorter cycle time and/or an earlier commencement of the ejection operation, which possibly cannot be adapted to the predetermined procedures in respect of time for the associated blow molding process, as for example the blow molding mold is still not ready to receive a preform at an earlier time of commencement of an ejection operation.

Theoretically the regulating options shown in FIGS. 7-10 are subjected to limitations by virtue of the limits of the maximum stroke movement of the annular piston, if the compensating volume is completely filled when the delivery output of the extruder is excessively high, or if it is completely emptied when the delivery output is excessively low. The limits will generally be attained when the extruder has deviations in the same direction, over a plurality of working cycles. At that moment the delivery output must be changed in such a way that either the system adopts the reference or desired condition or it is possible at least again to effect a compensating regulating procedure for example as shown in FIGS. 7-10. In that connection it may be provided that, for example if the delivery output of the extruder is excessively low, when a condition of complete emptying of the storage chamber is attained, the extruder may be brought to a stable operating condition which results in a slightly higher delivery output. After a plurality of cycles it will then be necessary to set a slightly lower level of delivery output as the storage chamber is then substantially filled. It may also be desirable to fill up a completely emptied storage chamber by the compensating volume of the storage chamber being filled again by at least one cycle with an extended cycle time. Conversely, the completely filled compensating volume of the storage chamber could be at least partially emptied again, by performing at least one cycle with a reduced cycle time. In regard to the last-mentioned possibilities however it is also necessary to take account of the cycle time of the associated blow molding machine so that variations of that kind do not have an adverse effect on the blow molding process. It will be particularly desirable for such compensating operations for the compensating volume of the storage chamber to be initiated before the invariable, structurally predetermined abutment positions for the annular piston are attained, so as to ensure that a preform of the required gross volume is ejected in each cycle. However the above-discussed possibilities will not be necessary in many cases as generally the delivery output of the extruder does not deviate exclusively in one direction from the reference delivery output thereof.

The regulating procedures shown in FIGS. 6–10 have the advantage that the compensating operations to be carried out still give the desired result even when for example deviations in the delivery output of the extruder, which can also exceed the admissible tolerance range, are detected just before the end of the filling phase, so that the effects of an intervention in relation to the operating condition of the extruder could no longer be monitored during the same working cycle. As the adaptation operations shown in FIGS. 6–10 are primarily in respect of operating parameters for the subsequent ejection operation, the adaptation operations can be carried out virtually without any time delay. In particular, these regulating procedures avoid frequent regulating intervention in relation to the operating condition of the extruder, in spite of which the gross volume required for the preform is ejected with a high level of accuracy.

In particular therefore it will be desirable for the delivery condition of the extruder, which is determined by the speed and the travel-time relationship in respect of the annular piston during the filling phase, to be ascertained at least just before or at the beginning of the ejection phase in order to obtain information about the delivery output during the ejection phase so that suitable interventions in respect of the operating parameters can possibly be carried out.

However, if there are excessive deviations in regard to the delivery output of the extruder, it may also be desirable firstly to intervene in relation to that operating condition, for example in accordance with the regulating system shown in FIG. 5, and, if that intervention does not give the full desired result, to effect a supplemental regulation operation as shown in FIGS. 6–10.

It is self-evident that regulation as shown in FIG. 7 or FIG. 10 can also be applied to a deviation as shown in FIG. 4. In such a case it would only be necessary for the lacking volume of material (distance B'B) to be taken from the compensating volume of the storage chamber, being the volume by which the amount stored in the storage chamber fell short during the filling phase $t_S$, as the delivery output of the extruder has again reached its reference value. Accordingly an additional volume $V_A'$ would not have to be ejected. Particularly when there is a disturbance of that kind in the operating condition, the advantages of the control and regulating unit according to the invention are apparent. As, in contrast to known regulating systems, the delivery output of the extruder is monitored during the filling phase, compensation is only effected in respect of the missing stored material, because the reference delivery output which occurs again at the end of the filling operation is detected. That means that there is no erroneous intervention in relation to the operating condition of the extruder, which is otherwise usual in this situation, with the result that in the subsequent working cycle the desired extruder output is maintained at any event when there are no additional influences occurring.

The description of the invention essentially relates to extrusion units which comprise an extruder and with which a blow molding mold is associated. It is self-evident that the invention can also be applied to those extrusion units which have a corresponding number of extruders for example for forming multi-layer preforms. If two or more blow molding units are associated with the extrusion unit, the invention enjoys particular significance as the portion of the volume of material which is conveyed into the extrusion head during the emptying phase is greater, with the result that deviations in the delivery output of the extruder will have greater effects.

We claim:

1. A process for the production of hollow bodies of thermoplastic material by batch wise extrusion and blow molding of hollow preforms comprising using an extrusion unit (2), which has at least one continuously operated extruder (10), and an extrusion head (9) which includes at least one storage chamber (18) receiving material plasticized in the at least one extruder and at least one member (19) reciprocatable with a stroke movement between two limit positions within the extrusion head to empty the at least one storage chamber, wherein a working cycle of the extrusion unit has two operating phases, an initial filling phase in which the at least one storage chamber is at least partially filled with displacement of the at least one member and a remaining ejecting phase in which the plasticized material in the at least one storage chamber is advanced towards the outlet opening (20) of the extrusion head by means of the at least one member and a portion of the volume of the plasticized material is ejected from the outlet opening to form at least one hollow preform, wherein the ejected portion of plasticized material by volume ($V_B$) is made up of a portion by volume ($V_S$) which was previously stored in the at least one storage chamber and a portion by volume ($V_E$) which, during the ejecting phase, passed into the extrusion head from the at least one extruder, wherein at least once during the filling phase of a working cycle, a value of one of actual speed and actual distance covered by the at least one member is detected, the detected value is compared to a predetermined reference value for the at least one member, which correspond to a reference delivery output of the at least one extruder and, at least when a deviation between the one detected value and the predetermined reference value exceeds a predetermined reference deviation value, at least one operating parameter of the extrusion unit is changed during a remainder of the one working cycle so that the actual volume of plasticized material ($V_B$) ejected by the at least one extrusion head during the remainder of the one working cycle is closer to a predetermined required gross volume for the hollow preform than would have been ejected by the extrusion head in the absence of the changing step.

2. A process as set forth in claim 1 characterised in that the reference delivery output of the at least one extruder is ascertained from the predetermined volume ($V_B$) of the preform to be ejected and the predetermined time of a working cycle ($t_Z$).

3. A process as set forth in claim 2 characterized in that the weight of the at least one hollow preform is obtained and compared to a predetermined reference weight, wherein in dependence on a detected deviation, a predetermined value of ejected portion volume ($V_B$) is changed in the next working cycle ($t_Z$) to define a reference delivery output for the at least one extruder.

4. A process as set forth in claim 3 characterizing that the weight measured is of at least one of the preforms, which were produced in a plurality of successive working cycles.

5. A process as set forth in claim 3 further comprising the steps of expanding at least a part of a central portion of the at least one hollow preform into an expanded hollow body in a divided blow molding mold having at least two mold portions which are movable relative to one another and forming end portions of the at least one hollow preform into waste portions and characterized in that the weight of the least one preform is obtained by measuring the weight of the expanded hollow body and all waste portions.

6. A process as set forth in claim 1 characterised in that at least at the end of the filling operation ($t_S$) the speed of the at least one member is detected to ascertain the actual delivery output of the at least one extruder (10).

7. A process as set forth in claim 1 characterised in that at least at the end of the filling operation ($t_S$) the distance covered and the speed of the at least one member is detected for ascertaining the actual delivery output of the at least one extruder (10).

8. A process as set forth in claim 1 characterised in that at a plurality of moments in time during the filling operation ($t_S$) the distance covered by and/or the speed of the at least one member (18) is detected for ascertaining the actual delivery output of the at least one extruder (10).

9. A process as set forth in claim 1 characterised in that at least during a part of the filling operation ($t_S$) the distance covered by and/or the speed of the at least one member is continuously detected for ascertaining the actual delivery output of the at least one extruder (10).

10. A process as set forth in claim 1 characterised in that a variation in the at least one operating parameter is effected in dependence on the moment in time of detection of a deviation from a reference value.

11. A process as set forth in claim 1 characterised in that a variation in the at least one operating parameter is also effected during the working cycle of the extrusion unit, in which the deviation is detected.

12. A process as set forth in claim 1 characterised in that a variation in the at least one operating parameter is also effected in the same operating phase in which the deviation is detected.

13. A process as set forth in claim 11 characterised in that a variation in the at least one operating parameter is effected in the operating phase of the same working cycle, which phase follows the operating phase in which the deviation is detected.

14. A process as set forth in claim 1 characterised in that, upon a deviation in the actual delivery output from the reference delivery output of the at least one extruder (10), the delivery output thereof experiences a change only when the effects of the change can be monitored in the same working cycle.

15. A process as set forth in claim 1 characterized in that upon detection of a variation in actual delivery output from a predetermined reference delivery output of the at least one extruder (10) in the filling phase of the one working cycle, stroke movement of the at least one member (19) is changed for the subsequent ejection phase of the one working cycle in order to at least partially compensate for a difference resulting from the variation in amount of plasticized material stored, wherein maximum stroke movement of the at least one member within the at least one storage chamber is greater than a predetermined reference stroke movement of the at least one member.

16. A process as set forth in claim 1 wherein a predetermined reference stroke movement of the at least one member corresponds to a predetermined reference volume of plasticized material to be stored in the at least one storage chamber and wherein a ratio of the predetermined reference volume to be stored to the volume of the ejected portion is equal to a ratio of the difference between cycle time ($t_Z$) and ejection time ($t_A$) to the cycle time ($t_Z$).

17. A process as set forth in claim 1 characterized in that upon detection of a deviation in actual delivery output from a reference delivery output of the at least one extruder (10) in the filling phase of one working cycle, speed of the at least one member is changed for the subsequent ejection phase of the one working cycle such that the at least one preform is ejected with a volume ($V_B$) closer to a predetermined volume value for the one preform than would have occurred had the speed of the one member remained unchanged.

18. A process as set forth in claim 1 wherein ejection speed of the at least one member is ascertained from stroke movement performed during the ejecting phase.

19. A process as set forth in claim 1 wherein upon detection of a deviation in actual delivery output from a predetermined reference delivery output of the at least one extruder, the extent of stroke movement and speed of the at least one member is changed for the subsequent ejecting phase of the one working cycle in such a way that, on the one hand, a predetermined volume ($V_B$) for a preform is ejected from the extrusion head with a greater level of accuracy and, on the other hand, a reference ejection time ($t_A$) is maintained by the extrusion unit with a greater degree of accuracy than would have occurred had the extent of stroke movement and speed of the one member remained unchanged.

20. A process as set forth in claim 2 wherein length of the stroke movement of the at least one member is changed with the change in length corresponding to an amount of plasticized material equal to a difference between a predetermined reference delivery amount of plasticized material and an actual delivery amount of plasticized material from the at least one extruder during a predetermined reference ejecting phase time.

21. A process as set forth in claim 20 wherein an amount of material which is supplied to the extrusion head by the at least one extruder, by virtue of a change in the ejection time produced by the change in the length of the stroke movement when the ejection speed of the at least one member is unchanged in relation to a predetermined reference ejection speed, is taken into consideration when changing the length of the stroke movement.

22. A process as set forth in claim 17 wherein speed during the ejection phase of the at least one member is so changed that ejection time is altered thereby and such that an amount of plasticized material is conveyed into the extrusion head by the at least one extruder during the altered ejection time, which amount corresponds to a difference between the predetermined volume value for the one preform and a previously stored amount of plasticized material.

23. A process as set forth in claim 18 wherein a volume difference between an amount of plasticized material ejected by the at least one member and a predetermined reference amount of plasticized material to be stored is set by means of altered length of the stroke movement of the at least one member (19), and wherein the volume difference corresponds to the amount of plasticized material which is supplied to the extrusion head (9) as too much or too little, as a result of actual delivery output of the at least on extruder during the actual ejecting phase, which, due to altered speed of the at least one member, at least approximately corresponds to a reference ejection time.

24. A process as set forth in claim 4 characterized in that the at least one hollow preform is expanded under an increased internal pressure within a mold cavity of a divided blow molding having at least two mold portions moveable relative to each other to form an expanded hollow body with waste portions and the weight of the expanded hollow body is measured with its waste portions to determine weight of the at least one hollow preform.

* * * * *